United States Patent
Sekine et al.

(10) Patent No.: US 10,615,433 B2
(45) Date of Patent: Apr. 7, 2020

(54) FUEL CELL STACK SEAL STRUCTURE AND PRODUCTION METHOD THEREFOR

(71) Applicant: NISSAN MOTOR CO., LTD., Yokohama-shi, Kanagawa (JP)

(72) Inventors: Norikatsu Sekine, Kanagawa (JP); Yasuhiro Numao, Kanagawa (JP); Keiji Ichihara, Kanagawa (JP); Takanori Oku, Kanagawa (JP); Hiroshi Miyaoka, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/780,912

(22) PCT Filed: Sep. 26, 2016

(86) PCT No.: PCT/JP2016/078243
§ 371 (c)(1),
(2) Date: Jun. 1, 2018

(87) PCT Pub. No.: WO2017/104212
PCT Pub. Date: Jun. 22, 2017

(65) Prior Publication Data
US 2018/0358634 A1 Dec. 13, 2018

(30) Foreign Application Priority Data

Dec. 18, 2015 (JP) ................. 2015-247073

(51) Int. Cl.
*H01M 2/38* (2006.01)
*H01M 2/40* (2006.01)
(Continued)

(52) U.S. Cl.
CPC ......... *H01M 8/0276* (2013.01); *H01M 8/026* (2013.01); *H01M 8/0254* (2013.01);
(Continued)

(58) Field of Classification Search
None
See application file for complete search history.

(56) References Cited

U.S. PATENT DOCUMENTS 7,270,906 B2* 9/2007 Haltiner, Jr. ........ H01M 8/0273
429/463
7,396,609 B2* 7/2008 Sugita .................... B32B 15/01
429/483

(Continued)

FOREIGN PATENT DOCUMENTS

EP 2991143 A1 3/2016
JP 2006-092924 A 4/2006
(Continued)

*Primary Examiner* — Cynthia H Kelly
*Assistant Examiner* — Julian Anthony
(74) *Attorney, Agent, or Firm* — Foley & Lardner LLP

(57) ABSTRACT

A fuel cell stack seal structure of a fuel cell stack, the fuel cell stack including a plurality of fuel cell single cells that are stacked, each of the fuel cell single cells including a membrane electrode assembly and a pair of separators holding the membrane electrode assembly between the pair of separators, includes inner peripheral sealing members and an outer peripheral sealing member at peripheral edges of a pair of separators, in which the inner peripheral sealing members close a gap between inner peripheral ribs that protrude at least towards a mutually facing sides of the pair of separators, and the outer peripheral sealing member that closes a gap between outer peripheral ribs that protrude at least towards the mutually facing sides of the pair of separators. The inner peripheral sealing members and the outer peripheral sealing member form a first closed space between the inner peripheral sealing members and the outer peripheral sealing member. The outer peripheral sealing member has a notch that communicates the first closed space with the outside.

20 Claims, 22 Drawing Sheets

(51) Int. Cl.
  *H01M 8/24* (2016.01)
  *H01M 2/20* (2006.01)
  *H01M 8/10* (2016.01)
  *H01M 2/08* (2006.01)
  *H01M 2/14* (2006.01)
  *H01M 8/0276* (2016.01)
  *H01M 8/0286* (2016.01)
  *H01M 8/0254* (2016.01)
  *H01M 8/026* (2016.01)
  *H01M 8/0271* (2016.01)
  *H01M 8/241* (2016.01)
  *H01M 8/2465* (2016.01)
  *H01M 8/1004* (2016.01)
  *H01M 8/1018* (2016.01)

(52) U.S. Cl.
  CPC ....... *H01M 8/0271* (2013.01); *H01M 8/0286* (2013.01); *H01M 8/241* (2013.01); *H01M 8/2465* (2013.01); *H01M 8/1004* (2013.01); *H01M 2008/1095* (2013.01); *Y02P 70/56* (2015.11)

(56) References Cited

U.S. PATENT DOCUMENTS

| | | | |
|---|---|---|---|
| 8,084,165 B2 * | 12/2011 | Kusakabe | H01M 8/0273 429/508 |
| 9,450,252 B2 | 9/2016 | Oku et al. | |
| 9,627,706 B2 | 4/2017 | Ichihara et al. | |
| 2002/0127461 A1 * | 9/2002 | Sugita | H01M 8/0271 429/465 |
| 2004/0043274 A1 * | 3/2004 | Scartozzi | H01M 8/04014 429/434 |
| 2008/0102344 A1 | 5/2008 | Shimizu | |
| 2010/0129725 A1 | 5/2010 | Roy et al. | |
| 2011/0236786 A1 * | 9/2011 | Iizuka | H01M 8/0273 429/482 |
| 2012/0270136 A1 * | 10/2012 | Mizusaki | H01M 8/0273 429/482 |
| 2014/0349217 A1 | 11/2014 | Shimizu | |
| 2015/0079491 A1 * | 3/2015 | Ishida | H01M 8/1004 429/434 |
| 2015/0325870 A1 * | 11/2015 | Sugino | H01M 8/249 429/469 |
| 2016/0079610 A1 | 3/2016 | Oku et al. | |
| 2016/0308238 A1 | 10/2016 | Ichihara et al. | |

FOREIGN PATENT DOCUMENTS

| | | |
|---|---|---|
| JP | 2008-547183 A | 12/2008 |
| JP | 2014-229577 A | 12/2014 |
| WO | WO-2014/171260 A1 | 10/2014 |
| WO | WO-2014/174944 A1 | 10/2014 |
| WO | WO-2014/174959 A1 | 10/2014 |

* cited by examiner

FUEL CELL STACK SEAL STRUCTURE AND PRODUCTION METHOD THEREFOR

TECHNICAL FIELD

The present invention relates to a fuel cell stack seal structure and a method for producing the same.

One of fuel cells that has been proposed is composed of a plurality of fuel cell single cells stacked in which the plurality of fuel cell single cells are integrally joined with each other at the peripheries thereof by resin that is disposed along the peripheries by injection molding (see Patent Document 1).

Another fuel cell that has been proposed is composed of a plurality of fuel cell single cells stacked that further includes a predetermined insulating structure at the peripheries of the plurality of fuel cell single cells (see Patent Document 2).

CITATION LIST

Patent Document

Patent Document 1: JP 2006-092924A
Patent Document 2: WO 2014/174944A

SUMMARY OF INVENTION

Technical Problem

However, a problem with the fuel cell of Patent Document 1 is that first sealing members may be damaged when injecting molding resin in injection molding since the molding resin is integrally joined with the first sealing members.

A problem with the fuel cell of Patent Document 2 is that it is required to space the fuel cell single cells at predetermined intervals or more for reliably disposing the above-described predetermined insulating structure, and it is difficult to reduce the intervals between the fuel cell single cells.

The present invention has been made in view of the above-described problems in the prior art. It is an object of the present invention to provide a fuel cell stack seal structure that can provide suitable sealing by sealing members even when the spacing between the fuel cell single cells is narrow, and a method for producing the seal structure.

Solution to Problem

The present inventors conducted a keen study in order to achieve the above-described object. As a result, they have found that the above-described object can be achieved by forming first closed space between inner peripheral sealing members and an outer peripheral sealing member disposed respectively at predetermined positions and forming a notch in the outer peripheral sealing member to communicate the first closed space with the outside. The present invention has been thus completed.

That is, the fuel cell stack seal structure of a fuel cell stack, the fuel cell stack comprising a plurality of fuel cell single cells stacked that comprise respective membrane electrode assemblies and respective pairs of separators holding the membrane electrode assemblies therebetween, includes inner peripheral sealing members and an outer peripheral sealing member. At least one of a pair of separators comprises an inner peripheral rib that protrudes at least towards a mutually facing side of the pair of separators at a peripheral part of the separator. At least one of the pair of separators comprises an outer peripheral rib that protrudes at least towards a mutually facing side of the pair of separators at an outer side of the inner peripheral rib. The inner peripheral sealing member closes a gap between the inner peripheral ribs of the pair of separators of the fuel cell single cells. The outer peripheral sealing member is disposed at an outer side of the inner peripheral sealing members to close a gap between the outer peripheral ribs of the pair of separators. The inner peripheral sealing members and the outer peripheral sealing member form first closed space between the inner peripheral sealing members and the outer peripheral sealing member. The outer peripheral sealing member has a notch that communicates the first closed space with the outside.

The method for producing a fuel cell stack seal structure of the present invention, which is to produce the above-described fuel cell stack seal structure of the present invention, involves the following Step (1) to Step (2).

In Step (1), a material of the inner peripheral sealing member is applied onto the inner peripheral rib of at least one of the pair of separators to form the inner peripheral sealing member that closes the gap between the inner peripheral ribs of the pair of separators when the membrane electrode assemblies are intervened between the pairs of separators, so as to produce a stack structure.

In Step (2), which is performed subsequent to Step (1), a notch forming member for forming the notch is disposed on a side face of the stack structure.

In Step (3), which is performed subsequent to Step (2), the stack structure is placed in a mold and a material of the outer peripheral sealing member is injected so as to form the outer peripheral sealing member, the first closed space and the notch, in which the outer peripheral sealing member is formed at an outer side of the inner peripheral sealing member to close the gap between the outer peripheral ribs of the pair of separators.

Advantageous Effects of Invention

In the present invention, the first closed space is formed between the inner peripheral sealing members and the outer peripheral sealing member disposed in a predetermined position, and the outer peripheral sealing member has the notch that communicates the first closed space with the outside. This can reduce a damage on the inner peripheral sealing members that is caused when the outer peripheral sealing member is installed. Therefore, it is possible to provide the fuel cell stack seal structure that can provide suitable sealing by the sealing members even when the spacing between the fuel cell single cells is narrow, and the method for producing the same.

DESCRIPTION OF EMBODIMENTS

Figure 1:
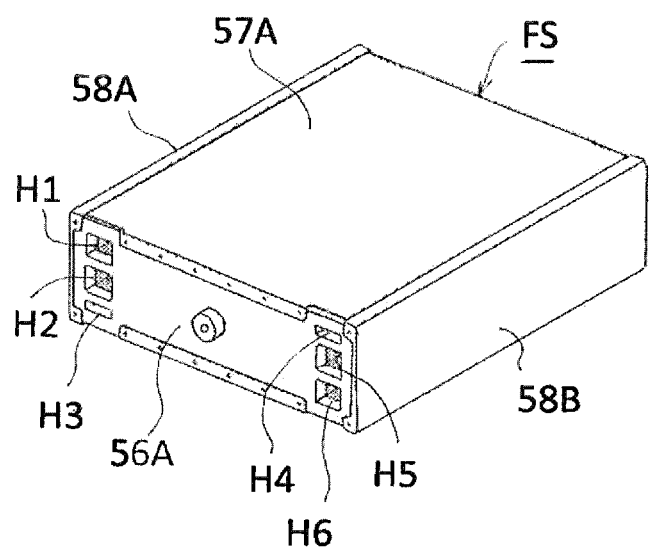
FIG. 1 is a perspective view of a fuel cell stack according to a first embodiment of the present invention.

Hereinafter, the fuel cell stack seal structure of the present invention and the method for producing the same will be described in detail. The following embodiments are examples in which the fuel cell is a polymer electrolyte fuel cell (PEFC). However, the present invention is not particularly limited thereto.

First Embodiment

First, a fuel cell stack and a fuel cell module according to a first embodiment of the present invention will be described in detail with the drawing. The dimension of the drawing referred to in the following embodiments is exaggerated for descriptive reasons and may be different from the actual dimension.

Figure 2:
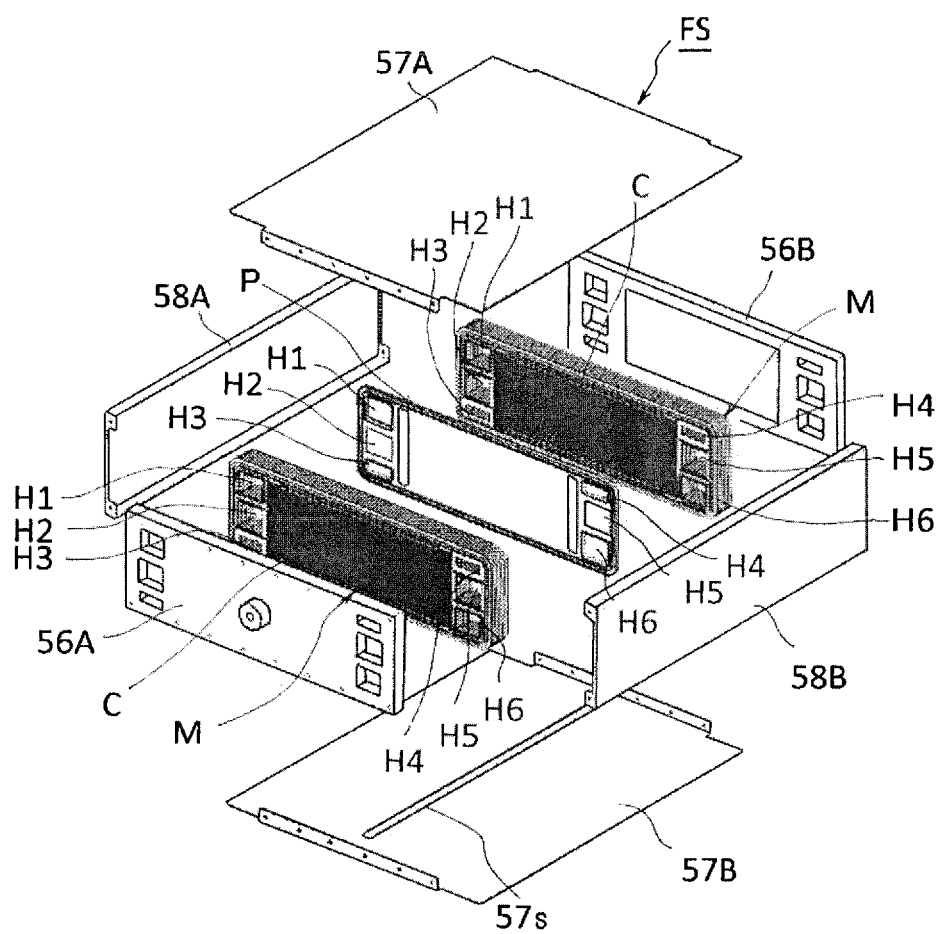
FIG. 2 is an exploded perspective view of the fuel cell stack according to the first embodiment of the present invention.
Figure 3:
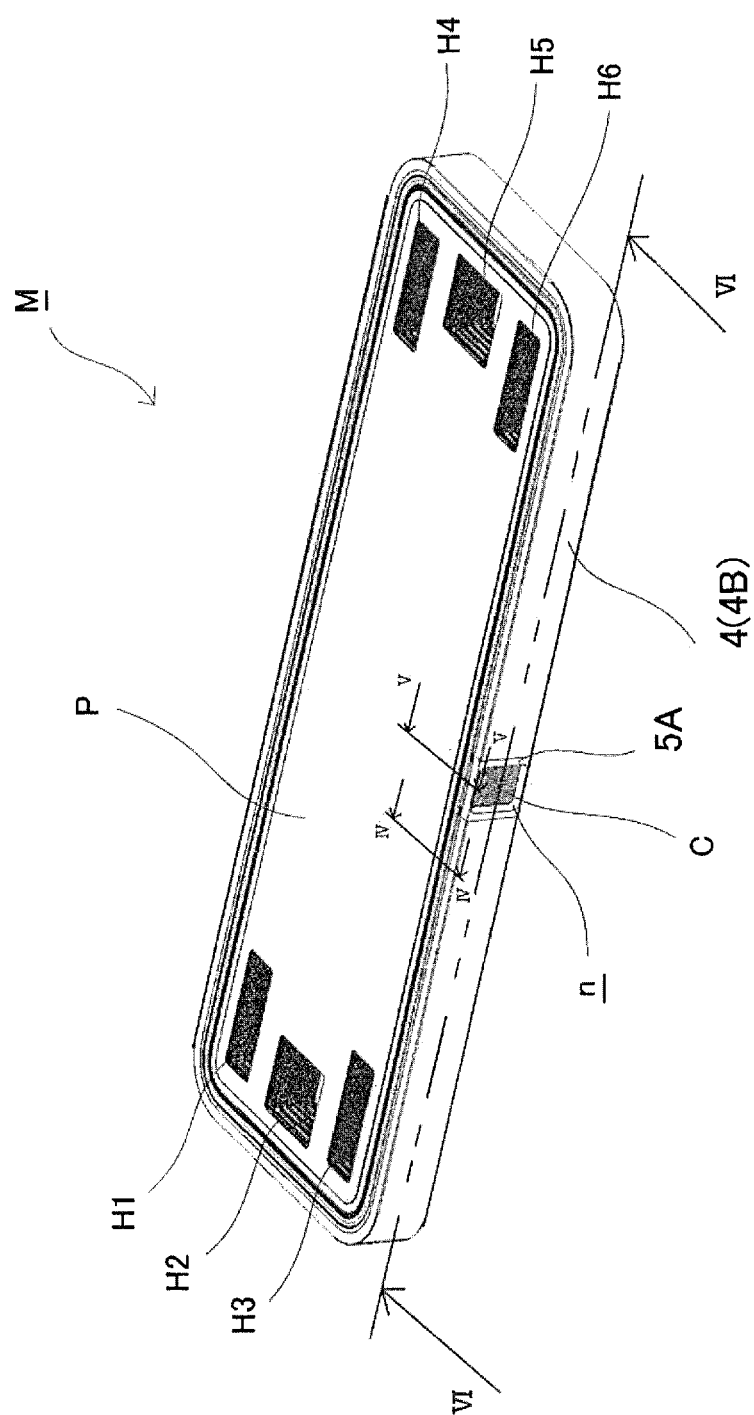
FIG. 3 is a perspective view of a fuel cell module according to the first embodiment of the present invention.
Figure 4:
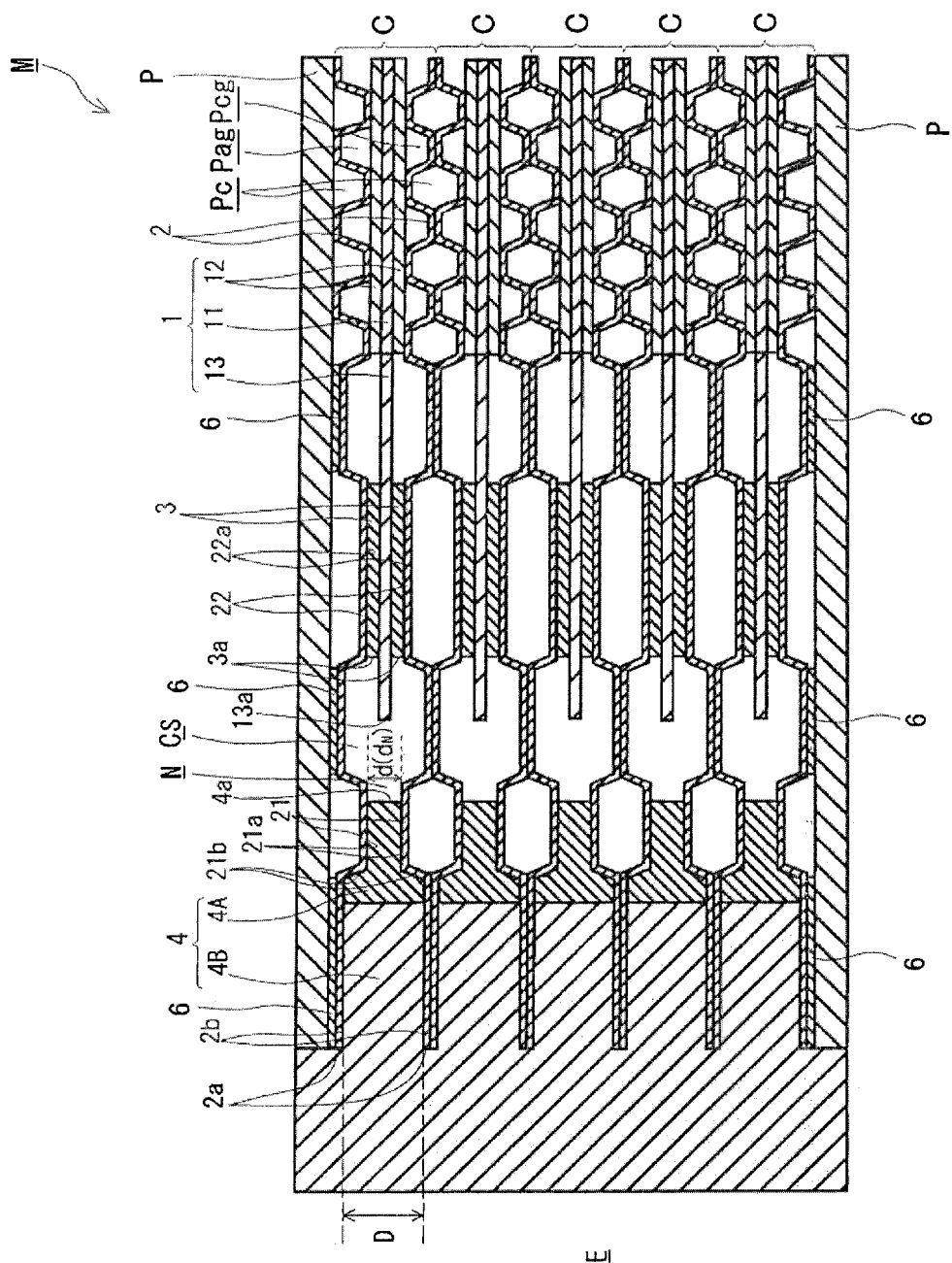
FIG. 4 is a schematic cross-sectional view of the fuel cell module in FIG. 3 taken along the line IV-IV.
Figure 5:
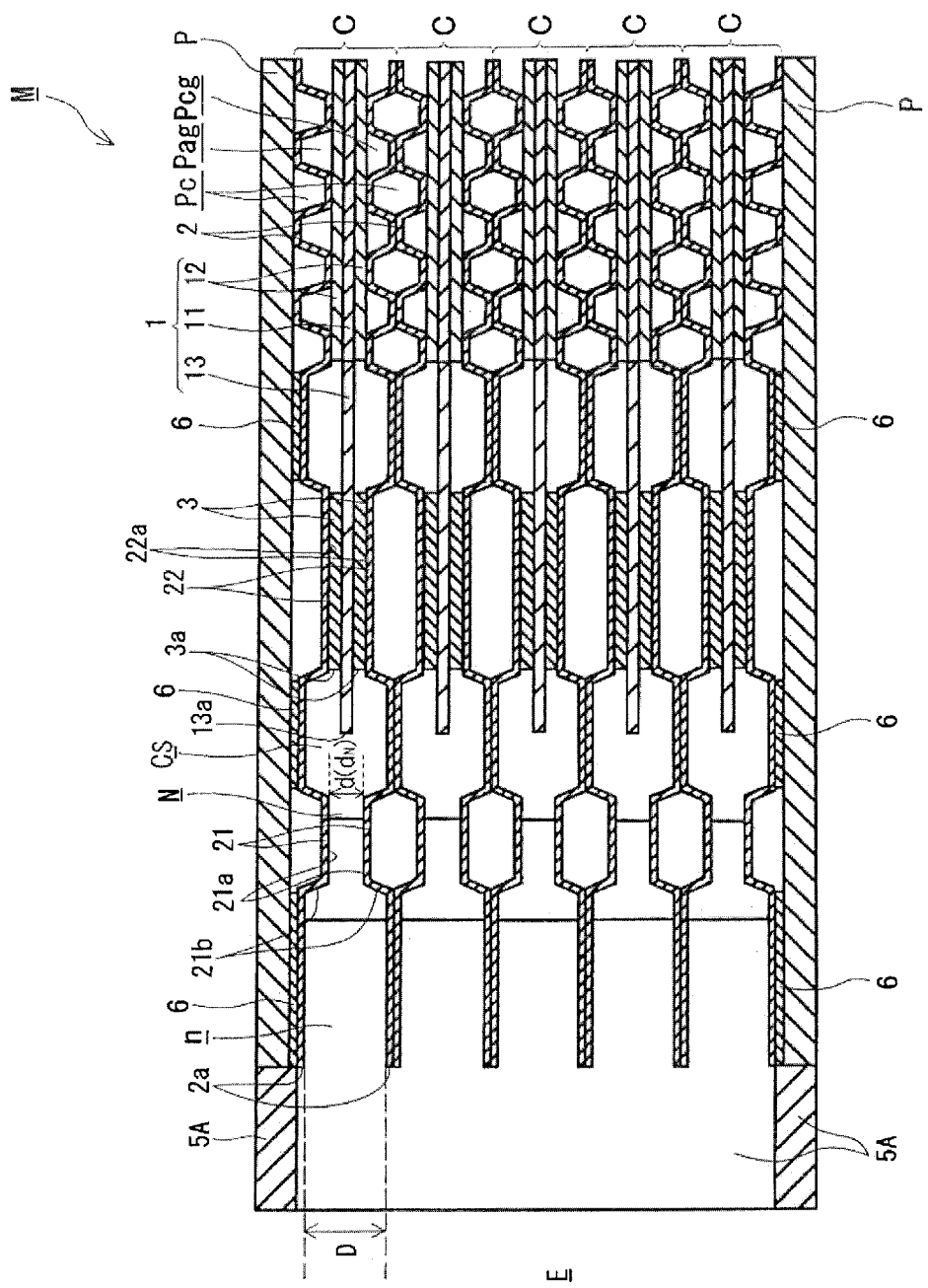
FIG. 5 is a schematic cross-sectional view of the fuel cell module in FIG. 3 taken along the line V-V.
Figure 6:
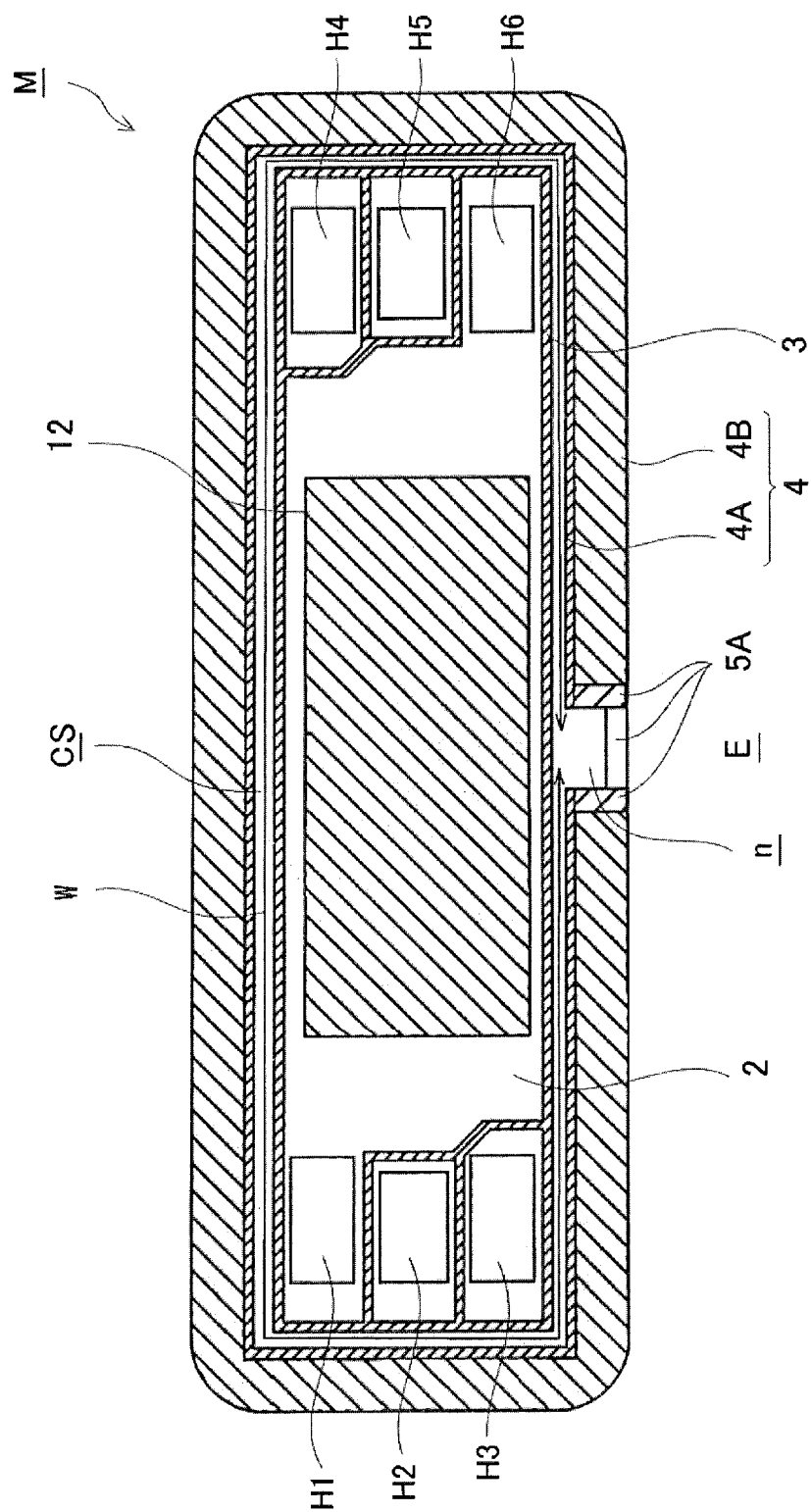
FIG. 6 is a schematic cross-sectional view of the fuel cell module in FIG. 3 taken along the line VI-VI.

FIG. 1 is a perspective view of the fuel cell stack according to a first embodiment of the present invention. FIG. 2 is an exploded perspective view of the fuel cell stack according to the first embodiment of the present invention. FIG. 3 is a perspective view of a fuel cell module according to the first embodiment of the present invention. FIG. 4 is a schematic cross-sectional view of the fuel cell module in FIG. 3 taken along the line IV-IV. FIG. 5 is a schematic cross-sectional view of the fuel cell module in FIG. 3 taken along the line V-V. FIG. 6 is a schematic cross-sectional view of the fuel cell module in FIG. 3 taken along the linen VI-VI.

As illustrated in FIG. 1 and FIG. 2, the fuel cell stack FS of the embodiment is composed of a plurality of fuel cell modules M each including a plurality of fuel cell single cells that are stacked and integrated, and sealing plates P intervened between the fuel cell modules M. The fuel cell single cells C and the sealing plates P of the illustrated example respectively have rectangular plate shapes that are approximately the same in length and width. While two fuel cell modules M and one sealing plate P are shown in FIG. 2, more fuel cell modules M and sealing plates P are actually stacked.

The fuel cell stack FS further includes end plates 56A, 56B disposed at both ends in the stacking direction of the fuel cell modules M, fastening plates 57A, 57B disposed on both faces corresponding to the long sides of the fuel cell single cells C (top and bottom faces in FIG. 1 and FIG. 2), and reinforcing plates 58A, 58B on both faces corresponding to the short sides. The fastening plates 57A, 57B and the reinforcing plates 58A, 58B are each coupled to both end plates 56A, 56B by bolts (not shown).

The fuel cell stack FS has such a case-integrated structure as illustrated in FIG. 1, which restrains and presses the fuel cell modules M and the sealing plates P in the stacking direction to apply a predetermined contact surface pressure to each of the fuel cell single cells C, so that the gas sealing property, the electrical conductivity and the like are maintained at high level. Each of the fuel cell modules M has a notch (not shown) in one face corresponding to a long side of the fuel cell modules M (bottom face in FIG. 1 and FIG. 2), which will be described later. Corresponding to the notch, the fastening plate 57B (lower fastening plate in FIG. 1 and FIG. 2) has a slit 57s through which the notch is exposed.

As illustrated in FIG. 3, each of the fuel cell modules M of the embodiment includes the plurality of fuel cell single cells C that are stacked. Further, each of the fuel cell modules M includes a sealing plate P on the top face and an outer peripheral sealing member 4 (4B) with a notch n (described later in detail) in a side face.

FIG. 3 illustrates an example of a fuel cell module M in which twenty fuel cell single cells C are stacked. For descriptive reasons, FIG. 4 and FIG. 5 illustrate an example of the fuel cell modules M in each of which five fuel cell single cells C are stacked. However, the number of fuel cell single cells C stacked is not particularly limited. For example, when a plurality of fuel cell single cells C is stacked and connected in series, the number of fuel cell single cells C stacked may be suitably set according to a required performance.

Each of the sealing plate P and separators 2 of the fuel cell single cells C has manifold holes H1 to H3 and H4 to H6 that are respectively disposed at the short-side ends. For example, the manifold holes H3, H4 are provided respectively to supply and discharge anode gas, the manifold holes H6, H1 are provided respectively to supply and discharge cathode gas, and the manifold holes H2, H5 are provided respectively to supply and discharge coolant such as water.

The fuel cell module M includes another sealing plate P on the bottom face (see FIG. 4 and FIG. 5) too. These sealing plates P are joined to separators 2 by fourth sealing members 6 (see FIG. 4 and FIG. 5). For example, the sealing plates may be made of metal such as stainless steel, although they are not particularly limited thereto.

The outer peripheral sealing member 4 (4B) (described in detail later) includes a frame-shaped notch forming member 5A at the notch n. The notch forming member 5A is not particularly limited and may be constituted by any member that secures electrical insulation between the separators 2. An example of the notch forming member 5A is a resin notch forming member. It is preferred that the notch forming member 5A can keep its original shape during injection of the material of the outer peripheral sealing member or an outer-outer peripheral sealing member (described in detail later) in the injection molding. The material of the notch forming member 5A may be similar to or the same as the material of the outer peripheral sealing member or the outer-outer peripheral sealing member or be different from the material of the outer peripheral sealing member and the outer-outer peripheral sealing member.

As illustrated in FIG. 4 to FIG. 6, each of the fuel cell single cells C includes a membrane electrode assembly 1 and a pair of separators (2, 2) that hold the membrane electrode assembly 1 therebetween. A plurality of such fuel cell single cells C is stacked to form the fuel cell stack. The separators 2 form an anode gas channel Pag, a cathode gas channel Pac and a coolant channel Pc. For example, the separators 2 may be made of metal such as stainless steel.

A fuel cell stack seal structure of the above-described fuel cell stack includes inner peripheral sealing members (3, 3) and the outer peripheral sealing member 4 (4A, 4B).

At least one separator 2 of the pair of separators (2, 2) includes an inner peripheral rib 22 that protrudes at least towards the facing surfaces 2b of the pair of separators (2, 2) at a peripheral part of the separator 2. Further, at least one separator 2 of the pair of separators (2, 2) includes an outer peripheral rib 21 that protrudes at least towards the facing surfaces 2b of the pair of separators (2, 2) at an outer peripheral side of the inner peripheral rib 22. The separator having the inner peripheral rib may be the same or different from the separator having the outer peripheral rib. In the illustrated example, both of the pair of separators (2, 2) include respective inner peripheral ribs (22, 22) that protrude towards the facing surfaces 2b of the pair of separators (2, 2) at the peripheral parts of the separators 2 and respective outer peripheral ribs (21, 21) that protrude towards the facing surfaces 2b of the pair of separators (2, 2) at an outer peripheral sides of the inner peripheral ribs (22, 22).

The inner peripheral sealing members 3 seal gaps between the inner peripheral ribs (22, 22) of the pairs of separators (2, 2) of the fuel cell single cells C. Further, the outer peripheral sealing member 4 is disposed at an outer side of the inner peripheral sealing members 3 to seal gaps between the outer peripheral ribs (21, 21) of the pairs of separators (2, 2). In the illustrated example, the inner peripheral sealing members 3 are disposed between protruded faces 22a of the inner peripheral ribs 22 and the frames 13. This facilitates alignment of the inner peripheral sealing members 3 and improves the sealing property. In terms of reducing an external force to be applied to the inner peripheral sealing members 3 and securing the sealing property, it is preferred that the outer peripheral ends 13a of the frames 13 are separated away from the outer peripheral sealing member 4 (4A).

As described above, the fuel cell stack seal structure forms first closed space CS between the inner peripheral sealing members (3, 3) and the outer peripheral sealing member 4 (4A, 4B). The outer peripheral sealing member 4 (4A, 4B) includes the notch n that communicates the first closed space CS with the outside E. Each of the first closed space CS continues in the circumferential direction of the separators 2 (in the direction perpendicular to the sheet in FIG. 4 and FIG. 5 or in the direction illustrated by the arrow W in FIG. 6). In the illustrated example, the outer peripheral sealing member has a single notch. However, depending on the required property, it may have two or more notches.

The membrane electrode assembly 1 includes an electrolyte membrane 11, electrodes (12, 12) that serve as an anode and a cathode, and a frame 13. For example, the membrane electrode assembly 1 can be formed by joining an electrode 12 to one face of the polymer electrolyte membrane 11 with a resin frame 13 attached along the entire periphery and joining an electrode 12 to the other face of the electrolyte membrane 11. Although not shown in the figures, the membrane electrode assembly may be configured such that no frame is attached to the electrolyte membrane or a frame is attached to the electrolyte membrane only at a part of the periphery thereof.

Further, although not shown in the figure, the electrodes may be composed of, for example, a catalyst layer disposed on the electrolyte membrane and a gas diffusion layer disposed on the opposite side. An example of such catalyst layers contains carbon particles carrying a catalytic component such as platinum. An example of such gas diffusion layers is made of a porous material such as carbon paper.

The outer peripheral ribs (21, 21) include portions at which the distance between a pair of separators (2, 2) is shorter than the distance D between outer peripheral ends (2a, 2a) of the pair of separators (2, 2). This distance d at the narrower portions satisfies a relation that d is less than D.

The outer peripheral ribs (21, 21) include respective protruded faces (21a, 21a) at which the distance between a pair of separators (2, 2) is uniform. Further, the outer peripheral ribs (21, 21) define a narrow path N where the distance between a pair of separators (2, 2) is shorter than the distance D between the outer peripheral ends (2a, 2a) of the pair of separators (2, 2). This width $d_N$ of a narrow path N satisfies a relation that $d_N$ is less than D.

The inner peripheral ends 4a of the outer peripheral sealing member 4 (4A) are located in the narrow path N.

In terms of improving the sealing property, it is preferred that either or both the outer peripheral sealing member 4 (4A, 4B) and the inner peripheral sealing members 3 have an adhesive function although the present invention is not particularly limited thereto.

In terms of improving the sealing property, it is preferred that either or both the outer peripheral sealing member 4 (4A, 4B) and the inner peripheral sealing members 3 are constituted by a filler although the present invention is not particularly limited thereto.

In terms of improving the sealing property, suitable examples of such fillers include fillers made of resin materials although the present invention is not particularly limited thereto.

In FIG. 4 and FIG. 5, the outer peripheral sealing member 4 (4A) (described in detail later) has a T-shape due to the outer peripheral ribs (21, 21) formed in both of the pair of separators (2, 2).

For example, the above-described outer peripheral ribs and the inner peripheral ribs can be formed by forming recesses preferably with flat bottom faces by press working on the other faces of the separators than the mutually facing faces.

The outer peripheral sealing member 4 includes the inner-outer peripheral sealing members 4A and the outer-outer peripheral sealing member 4B. The inner-outer peripheral sealing members 4A are disposed integrally in the narrow path N and at an outer side of the narrow path N. The outer-outer peripheral sealing member 4B is disposed at an outer side of the inner-outer peripheral sealing members 4A. At a side face of the fuel cell module M, the outer-outer peripheral sealing member 4B is integrated into one piece.

In terms of improving the sealing property, suitable examples of the inner-outer peripheral sealing members 4A include thermoset resins. Also, in terms of improving the sealing property, suitable examples of the outer-outer peripheral sealing member 4B is thermoplastic resins. However, the present invention is not limited thereto. For example, although not shown in the figures, the outer peripheral sealing member may be composed of the inner-outer peripheral sealing members and the outer-outer peripheral sealing member that are made of the same material and are integrated with each other. Suitable examples of the inner peripheral sealing members and the fourth sealing members include thermoset resins. However, the present invention is not limited thereto, and they may be made of a thermoplastic resin.

In the fuel cell stack seal structure of the embodiment, the first closed space is formed between the inner peripheral sealing members and the outer peripheral sealing member disposed in a predetermined position, and the outer peripheral sealing member has the notch that communicates the first closed space with the outside. This can prevent the inner peripheral sealing members from being damaged when installing the outer peripheral sealing member. As a result, even when the spacing between the fuel cell single cells is narrow, it is possible to provide the fuel cell stack seal structure that can provide suitable sealing by the sealing members.

That is, since the inner peripheral sealing members (3, 3) are disposed at an inner side of the outer peripheral sealing member 4 (4A, 4B), the sealing of power generating sites is secured. Further, since the outer peripheral sealing member 4 (4A, 4B) is disposed at the outer peripheral ribs (21, 21) so that the first closed space CS is formed between the outer peripheral sealing member 4 (4A, 4B) and the inner peripheral sealing members (3, 3) disposed at the inner peripheral ribs (22, 22), the inner peripheral sealing members (3, 3) are less likely to be damaged. Therefore, the sealing of the power generating sites is maintained.

The first closed space CS, which is formed between the inner peripheral sealing members (3, 3) and the outer peripheral sealing member 4 (4A, 4B), is communicated with the outside E. Therefore, for example, when the material of the outer peripheral sealing member is injected in the injection molding, it is possible to control the injection of the material of the outer peripheral sealing member by controlling air leak from the notch as well as injection pressure of the material of the outer peripheral sealing member, which will be described in detail later.

Therefore, the inner peripheral sealing members are less likely to be damaged, and the sealing of the power generating sites is maintained.

With the following configuration (1), the fuel cell stack seal structure as described above can provide more suitable sealing of the power generating sites by the sealing members even when the spacing between the fuel cell single cells is narrow.

(1) The outer peripheral ribs form portions at which the distance between a pair of separators is shorter than the distance between the outer peripheral ends of the pair of separators.

That is, the outer peripheral ribs (21, 21) make the material of the outer peripheral sealing member less likely to flow in beyond the outer peripheral ribs (21, 21), for example, when the material of the outer peripheral sealing member is injected in the injection molding, which will be described in detail later. This enables disposing the outer peripheral sealing member 4 (4A, 4B) surely in the predetermined position and thereby surely defining the predetermined first closed space CS. Therefore, the inner peripheral sealing members are less likely to be damaged, and the sealing of the power generating site is maintained.

With the following configuration (2), the fuel cell stack seal structure as described above can provide suitable sealing of the power generating sites by the sealing members even when the spacing between the fuel cell single cells is narrow.

(2) The outer peripheral ribs include protruded faces at which the distance between a pair of separators is uniform, and form a narrow path at which the distance between a pair of separators is shorter than the distance between the outer peripheral ends of the pair of separators.

That is, since the above-described outer peripheral ribs (21, 21) are provided, the outer side faces (21b, 21b) of the outer peripheral ribs (21, 21) enable disposing the outer peripheral sealing member 4 in a desired position by receiving an injection pressure of the material of the outer peripheral sealing member, for example, when the material of the outer peripheral sealing members is injected in the injection molding, which will be described in detail later. Further, the narrow path N defined by the outer peripheral ribs (21, 21) make the material of the outer peripheral sealing member less likely to flow in beyond the narrow path N, which enables disposing the outer peripheral sealing member 4 in a desired position. Therefore, the inner peripheral sealing members are less likely to be damaged, and the sealing of the power generating sites is maintained.

With the following configuration (3), the fuel cell stack seal structure as described above can provide more suitable sealing of the power generating sites by the sealing members and suitable electrical insulation between a pair of separators even when the spacing between the fuel cell single cells is narrow.

(3) The inner peripheral ends of the outer peripheral sealing member are disposed in the narrow path.

That is, since the above-described outer peripheral ribs (21, 21) are disposed, the outer side faces (21b, 21b) of the outer peripheral ribs (21, 21) enable disposing the outer peripheral sealing member 4 in a desired position by receiving an injection pressure of the material of the outer peripheral sealing member, for example, when the material of the outer peripheral sealing member is injected in the injection molding, which will be described in detail later. Further, the narrow path N defined by the outer peripheral ribs (21, 21) make the material of the outer peripheral sealing member further less likely to flow in beyond the narrow path N, which enables disposing the outer peripheral sealing member 4 in a desired position. Therefore, the inner peripheral sealing members are less likely to be damaged, and the sealing of the power generating sites is maintained.

By disposing the inner peripheral ends 4a of the outer peripheral sealing member 4 in the narrow path N, it is possible to maintain the spacing between the outer peripheral ribs (21, 21). Therefore, suitable electrical insulation between a pair of separators (2, 2) can be achieved.

With the following configuration (4), the fuel cell stack seal structure as described above can provide suitable sealing of the power generating sites by the sealing members even when the spacing between the fuel cell single cells is narrow.

(4) Either or both the outer peripheral sealing member and the inner peripheral sealing members have an adhesive function.

That is, the outer peripheral sealing member 4 (4A, 4B) and the inner peripheral sealing members 3 can maintain the spacing and the adhesion between a pair of separators. Therefore, the inner peripheral sealing members are less likely to be damaged, and the sealing of the power generating sites is maintained.

With the following configuration (5), the fuel cell stack seal structure as described above can provide suitable sealing of the power generating sites by the sealing members even when the spacing between the fuel cell single cells is narrow.

(5) Either or both the outer peripheral sealing member and the inner peripheral sealing members are made of a filler.

That is, the space between a pair of separators except for the first closed space can be filled with the outer peripheral sealing member 4 (4A, 4B) and/or the inner peripheral sealing members 3 made of a filler to establish sealing. Therefore, the sealing of the power generating sites is maintained.

With the following configuration (6), the fuel cell stack seal structure as described above can provide suitable sealing of the power generating sites by the sealing members even when the spacing between the fuel cell single cells is narrow.

(6) The filler is made of a resin material.

That is, the space between a pair of separators except for the first closed space can be filled with the outer peripheral sealing member 4 (4A, 4B) and the inner peripheral sealing members 3 made of a resin material to establish the sealing. Therefore, the sealing of the power generating sites is maintained. Further, suitable electrical insulation between a pair of separators can be achieved.

With the following configurations (7) to (9), the fuel cell stack seal structure as described above can provide suitable sealing of the power generating sites by the sealing members and suitable electrical insulation between a pair of separators even when the spacing between each pair of separators of the fuel cell single cells is narrow.

(7) The outer peripheral sealing member includes the inner-outer peripheral sealing members and the outer-outer peripheral sealing member.

(8) The inner-outer peripheral sealing members are integrally disposed in the narrow path and at an outer side of the narrow path.

(9) The outer-outer peripheral sealing member is disposed at an outer side of the inner-outer peripheral sealing members.

That is, since the inner-outer peripheral sealing members 4A and the outer-outer peripheral sealing member 4B have respective functions, suitable sealing of the power generating sites by the sealing members and suitable electrical insulation between a pair of separators (2, 2) can be achieved even when the spacing between the fuel cell single cells is narrow.

The inner-outer peripheral sealing members 4A mainly have the following functions (i) to (iii).

(i) Forming the predetermined first closed space CS to provide suitable sealing.

(ii) Placing the inner ends 4a in the narrow path N to provide suitable electrical insulation between a pair of separators (2, 2).

(iii) Making the material of the outer-outer peripheral sealing member 4B less likely to flow in when the material of the outer-outer peripheral sealing member 4B is injected in the injection molding.

The outer-outer peripheral sealing member 4B mainly has the following functions (iv) and (v).

(iv) Being disposed between a pair of separators (2, 2) to provide suitable sealing.

(v) Being integrated into one piece outside the outer peripheral ends 2a of the separators 2 to protect the side faces of the fuel cell modules from an external impact or the like.

With the following configuration (10), the fuel cell stack seal structure as described above can provide suitable sealing of the power generating sites by the sealing members even when the spacing between the fuel cell single cells is narrow.

(10) The outer peripheral sealing member includes the notch forming member at the notch.

That is, if the notch forming member 5A were removed after forming the notch n, side faces of the fuel cell modules M would be subjected to an unwanted force that may damage the inner peripheral sealing members 3. To avoid this, the notch forming member 5A is configured to be left even after the notch n is formed so that the inner peripheral sealing members 3 are less likely to be damaged, and the sealing of the power generating sites is thus maintained. When the notch forming member 5A is made of a similar or the same material as the outer peripheral sealing member or the outer-outer peripheral sealing member, the part that comes in contact with the injected molten material of the outer peripheral sealing member or the outer-outer peripheral sealing member is partially melted and fused. Therefore, high air tightness and high durability are achieved.

With the following configurations (11) and (12), the fuel cell stack seal structure as described above can provide suitable sealing of the power generating sites by the sealing members even when the spacing of the fuel cell single cells is narrow.

(11) The inner-outer peripheral sealing members contain a thermoset resin.

(12) The outer-outer peripheral sealing member contains a thermoplastic resin.

That is, the inner-outer peripheral sealing members 4A that form the first closed space CS are less likely to be damaged by heat when the material of the outer-outer peripheral sealing member is injected in the injection molding after a stack structure is formed by using the material of the inner-outer peripheral sealing members, which will be described in detail later. Therefore, the inner peripheral sealing members are less likely to be damaged, and the sealing of the power generating sites is maintained.

With the following configuration (13), the fuel cell stack seal structure as described above can provide more suitable sealing of the power generating sites by the sealing members even when the spacing between the fuel cell single cells is narrow.

(13) The membrane electrode assemblies include respective frames that are held by the inner peripheral ribs.

That is, the inner peripheral sealing members 3 are disposed between the protruded faces 22a of the inner peripheral ribs 22 and the frames 13. This facilitates alignment of the inner peripheral sealing members and can also improve the sealing property.

Figure 7A:
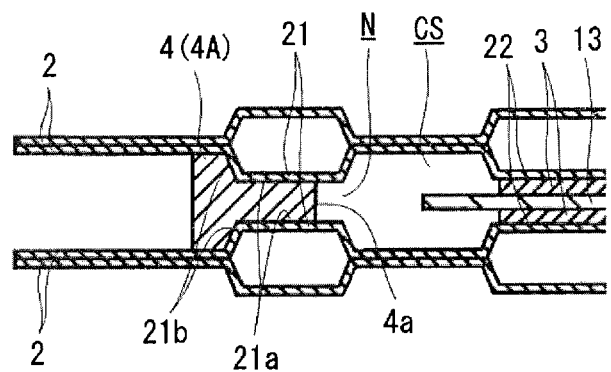
FIG. 7A, FIG. 7B and FIG. 7C are schematic cross-sectional views of a few examples of a fuel cell stack seal structure.
Figure 7B:
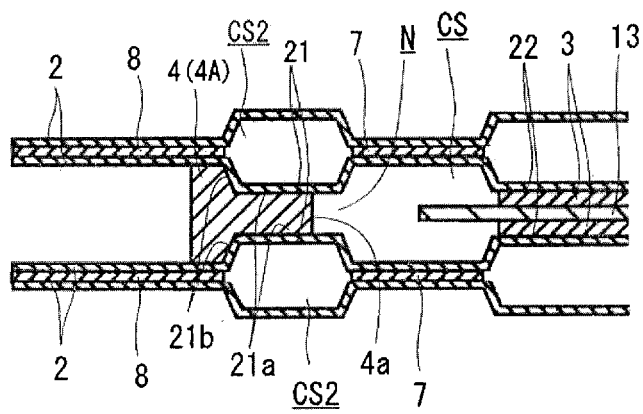
Figure 7C:
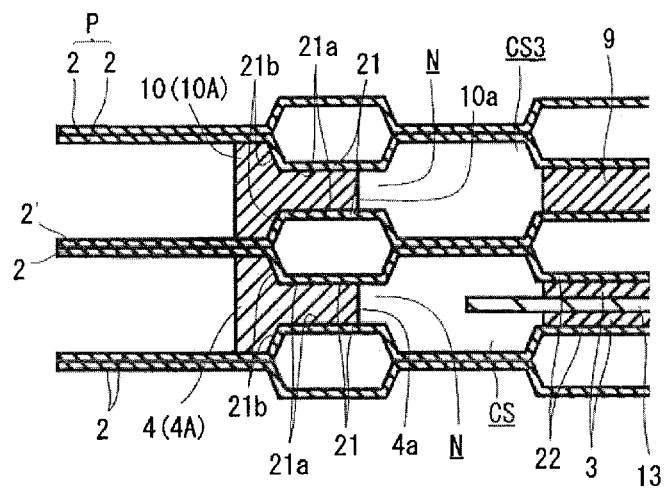

A few examples of the fuel cell stack seal structure will be described with the drawings. FIG. 7A, FIG. 7B and FIG. 7C are schematic cross-sectional views of a few examples of the fuel cell stack seal structure. The same reference signs are denoted to the same components as those described above, and the description thereof is omitted.

As illustrated in FIG. 7A, the outer peripheral sealing member 4 (4A) is formed in a T-shape by the outer peripheral ribs (21, 21) formed in both of the pair of separators (2, 2). With the outer side faces 21b, the outer peripheral ribs 21 can receive and diffuse injection pressure when the material of the outer-outer peripheral sealing member is injected. This can reduce or prevent the material from flowing into the first closed space CS.

Since the outer peripheral ribs 21 define the narrow path N by the protruded faces 21a, they can reduce or prevent the material from flowing into the first closed space CS.

Further, since the outer peripheral ribs 21 define the narrow path N by the protruded faces 21a of and the inner peripheral ends 4a of the outer peripheral sealing member 4 (4A) are disposed in the narrow path N, more suitable electrical insulation between the pair of separators (2, 2) can be achieved.

As illustrated in FIG. 7B, it is preferred that the fuel cell stack seal structure further has the following configuration (14) as well as the configurations (15) and (16) as in FIG. 5 (details not shown in the figure though). This can provide suitable sealing of coolant channels by the sealing members in addition to suitable sealing of the power generating sites with the sealing members even when the spacing of the fuel cell single cells is narrow.

(14) The structure further includes a second inner peripheral sealing member that closes a gap between peripheral edges of the fuel cell single cells and a second outer peripheral sealing member that is disposed at an outer side of the second inner peripheral sealing member to close the gap between the peripheral edges of the fuel cell single cells.

(15) A second closed space is formed between the second inner peripheral sealing member and the second outer peripheral sealing member.

(16) The second outer peripheral sealing member has a notch that communicates the second closed space with the outside.

That is, the first closed space CS is formed between the inner peripheral sealing members 3 and the outer peripheral sealing member 4, the outer peripheral sealing member 4 has a notch that communicates the first closed space CS with the outside (not shown). Furthermore, the second closed space CS2 is formed between the second inner peripheral sealing member 7 and the second outer peripheral sealing member 8, and the second outer peripheral sealing member 8 has a notch that communicates the second closed space CS2 with the outside (not shown). This can prevent the inner peripheral sealing members 3 and the second inner peripheral sealing member 7 from being damaged respectively when the outer peripheral sealing member 4 and the second outer peripheral sealing member 8 are installed.

Therefore, it is possible to provide the fuel cell stack seal structure that can provide more suitable sealing by the sealing members even when the spacing between the fuel cell single cells is narrow.

The second inner peripheral sealing member 7 may be made of materials as same as the inner peripheral sealing member 3. The second outer peripheral sealing member 8 may be made of materials as same as the outer peripheral sealing member 4. Alternatively, the second inner peripheral sealing member 7 and the second outer peripheral sealing member 8 may be made of materials other than those mentioned above.

With the following configurations (17) and (18) that are further combined with the configurations (19) and (20) as in FIG. 5 (not shown in detail through), the fuel cell stack seal structure as illustrated in FIG. 7C can provide suitable sealing of coolant channels on the sealing plates by the sealing members as well as suitable sealing of the power generating sites by the sealing members even when the spacing between the fuel cell single cells is narrow.

(17) The fuel cell stack structure, which includes the plurality of fuel cell modules stacked each including the plurality of fuel cell single cells stacked, includes a sealing plate disposed between two of the plurality of fuel cell modules, a third inner peripheral sealing member and a third outer peripheral sealing member.

(18) The third inner peripheral sealing member closes a gap between an end separator of each of the fuel cell modules and the sealing plate at the peripheral edge, and the third outer peripheral sealing member is disposed at an outer side of the third inner peripheral sealing member to close the gap between the end separator of each of the fuel cell modules and the sealing plate at the peripheral edge.

(19) Third closed space is formed between the third inner peripheral sealing member and the third outer peripheral sealing member.

(20) The third outer peripheral sealing member has a notch that communicates the third closed space with the outside.

That is, each of the fuel cell modules includes the end separator 2' at the end, and the sealing plate P of the illustrated example is composed of separators (2, 2). The first closed space CS is formed between the inner peripheral sealing members 3 and the outer peripheral sealing member 4, the outer peripheral sealing member 4 has a notch that communicates the first closed space CS with the outside (not illustrated). Furthermore, the third closed space CS3 is formed between the third inner peripheral sealing member 9 and the third outer peripheral sealing member 10 (10A), and the third outer peripheral sealing member has a notch that communicates the third closed space CS3 with the outside. This can prevent the inner peripheral sealing members 3 and the third inner peripheral sealing member 9 from being damaged when the outer peripheral sealing member 4 and the third outer peripheral sealing member 10 (10A) are installed.

Therefore, it is possible to provide the fuel cell stack seal structure that can provide suitable sealing by the sealing members even when the spacing between the fuel cell single cells is narrow.

The third inner peripheral sealing member 9 may be made of materials as same as the inner peripheral sealing members 3. Also, the third outer peripheral sealing member 10 may be made of materials as same as the outer peripheral sealing member 4. Alternatively, the third inner peripheral sealing member 9 and the third outer peripheral sealing members 10 may be made of materials other than those mentioned above. The configurations shown in FIG. 7B and FIG. 7C may be combined. For the same reason as in the outer peripheral sealing member, it is preferred that an inner peripheral end 10a of the third outer peripheral sealing member 10 (10A) is disposed in the narrow path N.

Figure 8A:
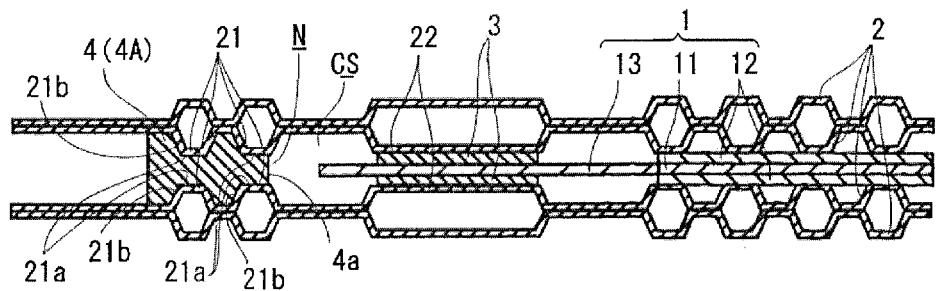
FIG. 8A, FIG. 8B, FIG. 8C, FIG. 8D, FIG. 8E and FIG. 8F are schematic cross-sectional views of an outer peripheral rib, illustrating a variation in shape.

A few variations in shape of the outer peripheral ribs will be described in detail referring to the drawing. FIG. 8A, FIG. 8B, FIG. 8C, FIG. 8D, FIG. 8E and FIG. 8F are schematic cross-sectional views of variations in shape of the outer peripheral ribs. FIG. 8A illustrates outer peripheral ribs (21, 21) that are formed in both of the pair of separators (2, 2), which form the outer peripheral sealing member 4 (4A)

Figure 8B:
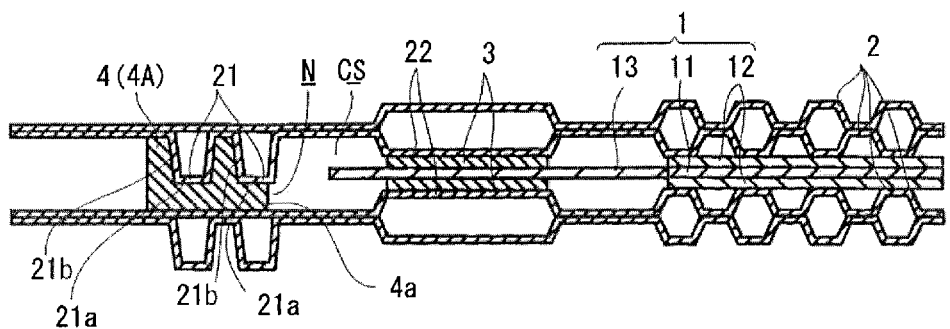
Figure 8C:
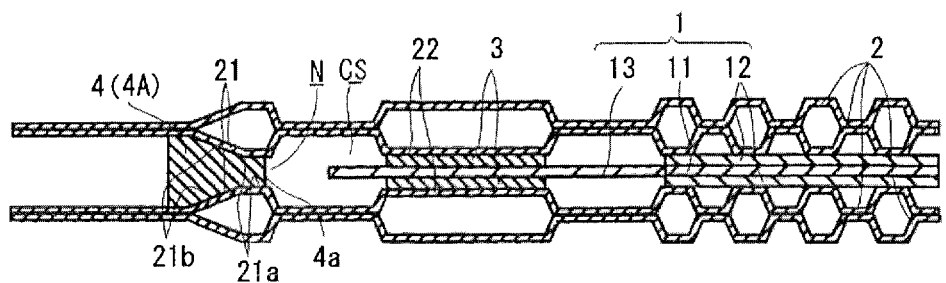
Figure 8D:
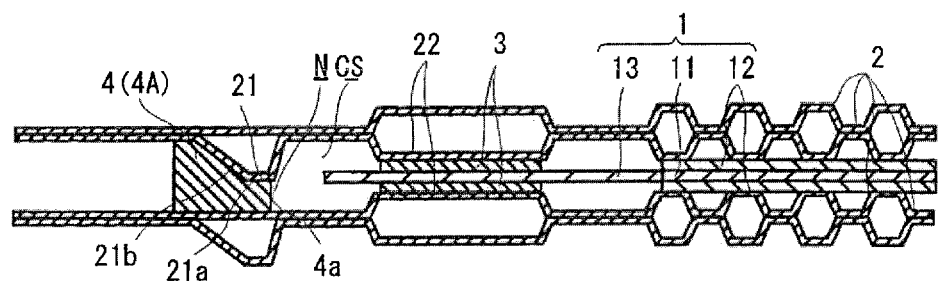
Figure 8E:
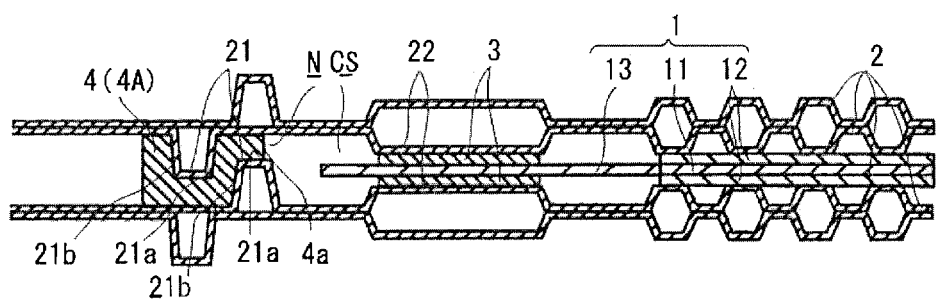
Figure 8F:
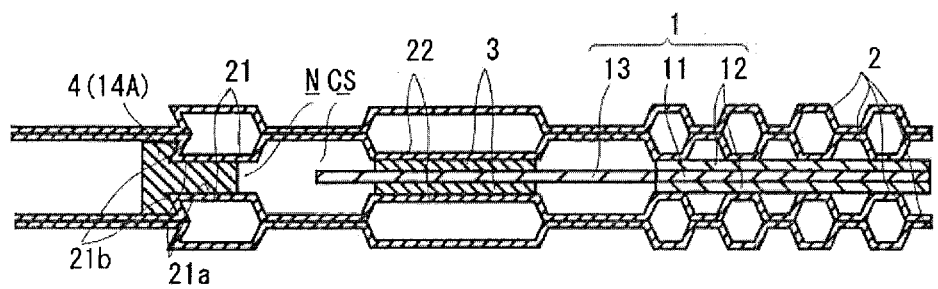

(described in detail later) in an H-shape. FIG. 8B illustrates outer peripheral ribs (21, 21) that are formed in one of the pair of separators (2, 2), which form the outer peripheral sealing member 4 (4A) (described in detail later) in an F-shape. FIG. 8C illustrates outer peripheral ribs 21 that are formed in both of the pair of separators (2, 2), which form the outer peripheral sealing member 4 (4A) (described in detail later) in a Y-shape. FIG. 8D illustrates outer peripheral ribs 21 that are formed in one of the pair of separators (2, 2), which form the outer peripheral sealing member 4 (4A) (described in detail later) in an L-shape. FIG. 8E illustrates outer peripheral ribs (21, 21) that are formed in both of the pair of separators (2, 2), which form the outer peripheral sealing member 4 (4A) (described in detail later) in a U-shape. FIG. 8F illustrates outer peripheral ribs (21, 21) that are formed in both of the pair of separators (2, 2), which form the outer peripheral sealing member 4 (4A) (described in detail later) in an inversed shape.

The outer peripheral ribs 21 in FIG. 8A, FIG. 8B, FIG. 8C, FIG. 8D, FIG. 8E and FIG. 8F can receive and diffuse injection pressure by outer side faces 21b when the material of the outer peripheral sealing member is injected in the injection molding. This can reduce or prevent the material from flowing into the first closed space CS. Further, since the outer peripheral ribs 21 in FIG. 8A, FIG. 8B, FIG. 8C, FIG. 8D, FIG. 8E and FIG. 8F define a narrow path N by their protruded faces 21a, they can reduce or prevent the material from flowing into the first closed space CS. Further, since the outer peripheral ribs 21 in FIG. 8A, FIG. 8B, FIG. 8C, FIG. 8D, FIG. 8E and FIG. 8F define a narrow path N by the protruded faces 21a and the inner peripheral ends 4a of the outer peripheral sealing member 4 (4A) are located in the narrow path N, they can provide more suitable electrical insulation between the pair of separators (2, 2).

In the study for a fuel cell stack seal structure that can provide suitable sealing by sealing members even when the spacing between fuel cell single cells is narrow, the present inventors have found that the structure has another advantageous effect that is totally different.

Specifically, another problem to be solved arises, for example, when outer peripheral sealing member is simply disposed so as to form closed spaces that continue in the circumferential direction of the separators between the inner peripheral sealing members and the outer peripheral sealing member, in order to reduce the chance of the inner peripheral sealing members being damaged.

That is, technical finding that has been made is that when a fuel cell has a sealing structure with no notch that communicates a closed space with the outside, water vapor that is produced in a power generating sites during power generation may penetrate a frame and inner peripheral sealing members and be liquefied in the closed space to cause degradation of the performance such as a short circuit between separators and hydrolysis of the frame.

It can be said that a fuel cell according to another present invention has been made based on this technical finding, although the prevent invention is not particularly limited by it. The present inventors have found that the above-described object can be achieved by a configuration that first closed space is formed between inner peripheral sealing members and outer peripheral sealing member disposed in a predetermined position, and the outer peripheral sealing member has a notch that communicates the first closed space with the outside. Another present invention has been thus completed.

Figure 9:
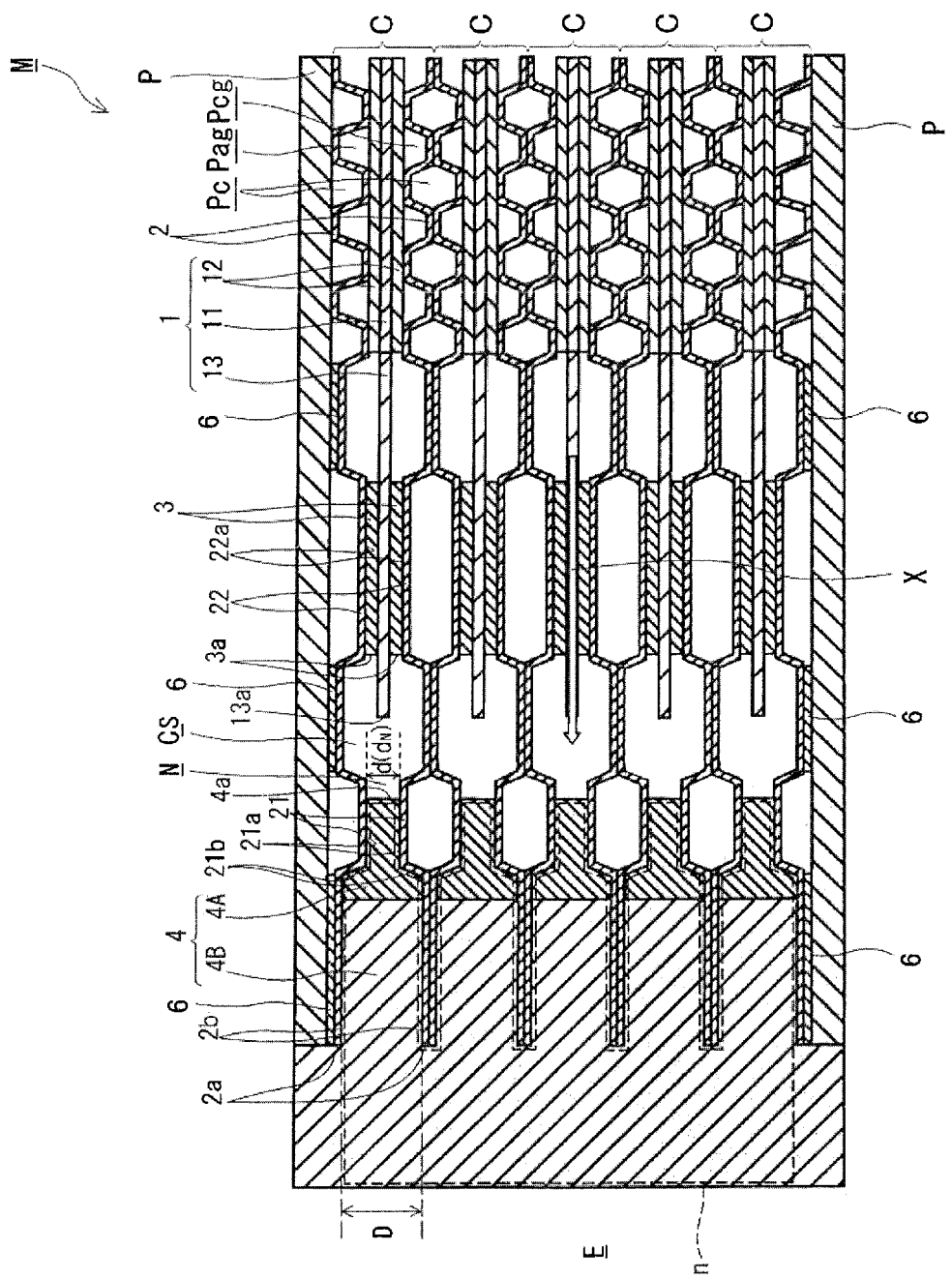
FIG. 9 is a schematic cross-sectional view of the fuel cell module in FIG. 3 taken along the line IV-IV.

That is, by the same configuration as the above-described embodiment as illustrated in FIG. 9, water that penetrates the frames and inner peripheral sealing members as illustrated by the arrow X in the figure and droplets thereof that are liquified in the closed spaces can be discharged through the notch n illustrated by the dashed lines (see also FIG. 5). This can reduce or prevent degradation of the performance such as a short circuit between the separators and hydrolysis of the frames.

A secondary advantageous effect of the present invention and another present invention is that it is possible to conduct an air tightness test or a liquid tightness test of the fuel cell single cells by using the notches that communicate the closed spaces with the outside.

Second Embodiment

Next, a fuel cell module according to a second embodiment of the present invention will be described in detail referring to the drawing. The same reference signs are denoted to the same components as those of the above-described embodiment, and the description thereof is omitted.

Figure 10A:
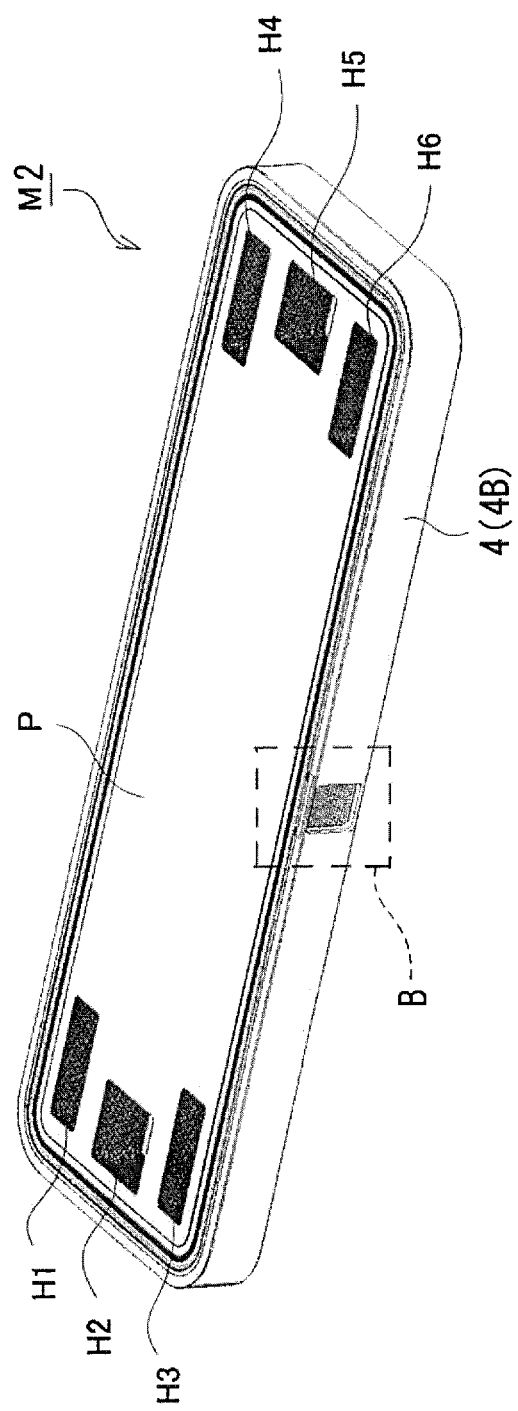
FIG. 10A is a perspective view of a fuel cell module according to a second embodiment of the present invention.
Figure 10B:
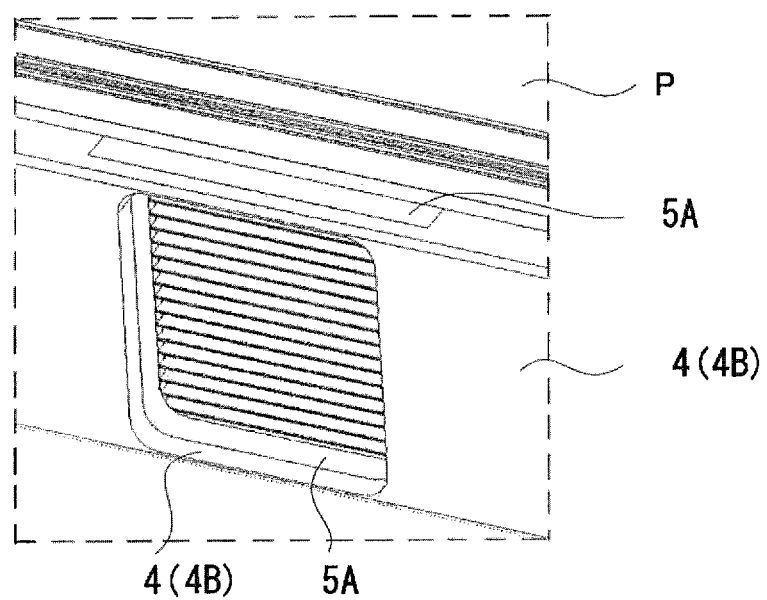
FIG. 10B is an enlargement of the part of the fuel cell module in FIG. 10A enclosed by the line B.

FIG. 10A is a perspective view of the fuel cell module according to the second embodiment of the present invention, and FIG. 10B is an enlargement of the part enclosed by the line B of the fuel cell module in FIG. 10A. As illustrated in FIG. 10A and FIG. 10B, the fuel cell module M2 of the embodiment is different from the fuel cell modules of the above-described first embodiment in that a notch forming member 5A is covered with outer peripheral sealing member 4 (4B).

In addition to the advantageous effects of the first embodiment, this embodiment is advantageous in the higher air tightness and the longer durability since the notch forming member is integrated with the outer peripheral sealing member.

Third Embodiment

Next, a fuel cell module according to a third embodiment of the present invention will be described in detail referring to the drawing. The same reference signs are denoted to the same components as those in the above-described embodiments, and the description thereof is omitted.

Figure 11:
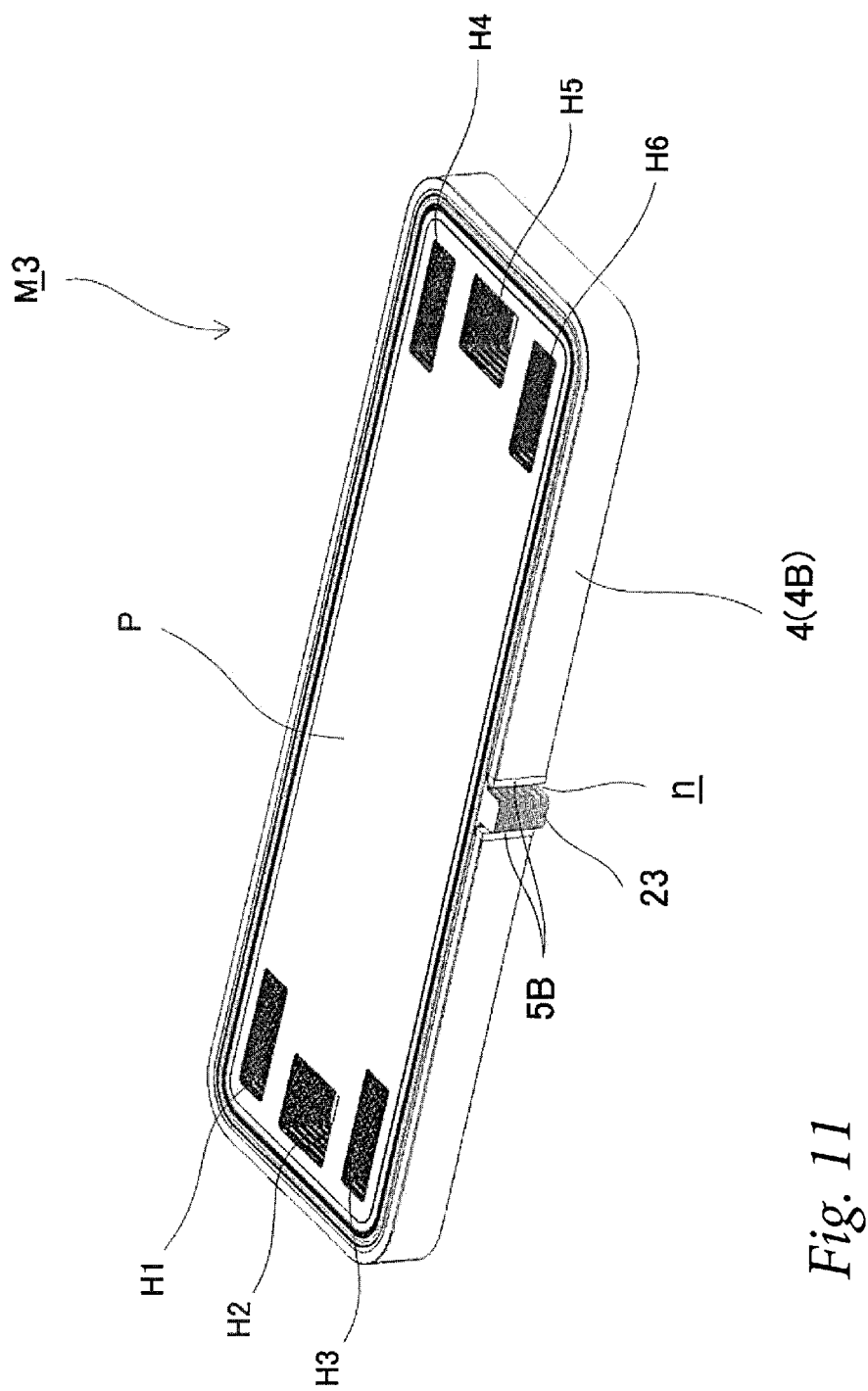
FIG. 11 is a perspective view of a fuel cell module according to a third embodiment of the present invention.

FIG. 11 is a perspective view of the fuel cell module according to the third embodiment of the present invention. As illustrated in FIG. 11, the fuel cell module M3 of the embodiment is different from the fuel cell modules of the above-described first embodiment in that outer peripheral sealing member 4 (4B) includes a notch forming member 5B having the shape of a pair of plates, separators include respective protruded measuring terminals 23 that extend in the in-plane direction, and the measuring terminals 23 are exposed at the notches n.

In addition to the advantageous effects of the first embodiment, this embodiment is advantageous in that, for example, the voltage of fuel cell single cells is measurable since the measuring terminals are exposed at the notches.

Fourth Embodiment

Next, a fuel cell module according to a fourth embodiment of the present invention will be described in detail referring to the drawing. The same reference signs are denoted to the same components as those in the above-described embodiments, and the description thereof is omitted.

Figure 12A:
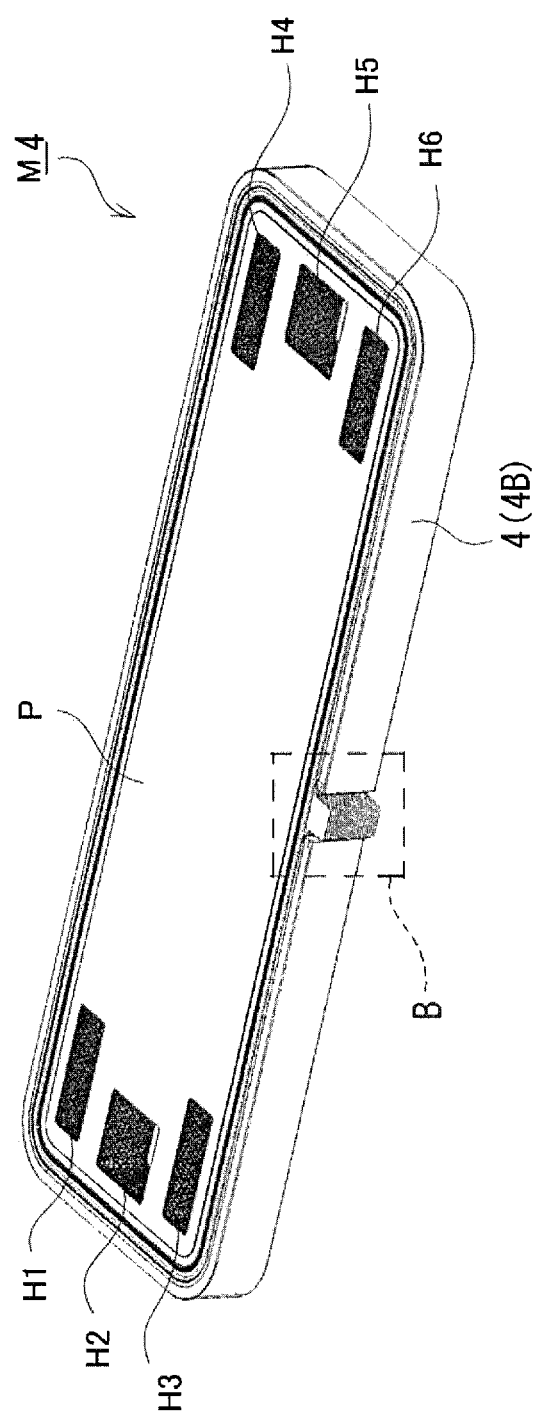
FIG. 12A is a perspective view of a fuel cell module according to a fourth embodiment of the present invention.
Figure 12B:
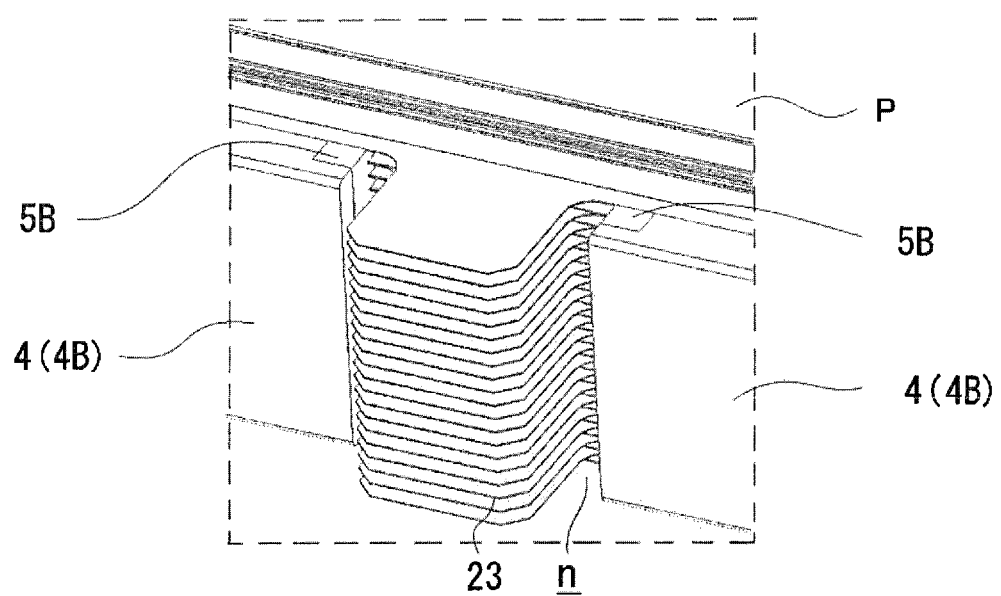
FIG. 12B is an enlargement of the part of the fuel cell module in 12A enclosed by the line B.

FIG. 12A is a perspective view of the fuel cell module according to a fourth embodiment of the present invention, and FIG. 12B is an enlargement of the part enclosed by the line B of the fuel cell module in FIG. 12A. As illustrated in FIG. 12A and FIG. 12B, the fuel cell module M4 of the embodiment is different from the fuel cell module of the above-described third embodiment in that notch forming members 5B are covered with outer peripheral sealing member 4 (4B).

In addition to the advantageous effects of the third embodiment, this embodiment is advantageous in the higher air tightness and the longer durability since the notch forming members are integrated with the outer peripheral sealing member.

Hereafter the method for producing the fuel cell stacks or modules according to the above-described embodiments will be described in detail with a few examples. By such production methods, it is possible to produce a desired fuel cell seal structure and a module seal structure with high productivity. It should be understood well that the fuel cell stack seal structure or the module seal structure of the present invention is not limited to the fuel cell stack seal structures or module seal structures produced by such methods.

An example method for producing the fuel cell stack seal structures or the module seal structures according to the above-described embodiments involves the following Step (1) to Step (3).

In Step (1), the material of the inner peripheral sealing members is applied onto an inner peripheral rib of at least one of a pair of separators to form the inner peripheral sealing members that close gaps between the inner peripheral ribs of the pair of separators when the membrane electrode assembly is sandwiched between the pair of separators, so that a stack structure is produced.

In Step (1), it is preferred that the material of the inner peripheral sealing members has an adhesive function and is a filler and a resin material. Specifically, it is preferred to use a thermoset adhesive. In this step, for example, a dispenser or a roller can be used to apply the material of the inner peripheral sealing members.

In Step (2), which is performed subsequent to Step (1), the notch forming member for forming the notch is disposed in a side face of the stack structure.

The notch forming member in Step (2) is not particularly limited and may be any member that can reduce or prevent the material from flowing into the notches or gaps between the measuring terminals. Examples of notch forming members that can be used include resin members having the shape of a frame or a pair of plates. The notch forming member can be suitably disposed according to the position and the number of notches to be formed in side faces of the fuel cell modules.

In Step (3), which is performed subsequent to Step (2), the stack structure is placed in a mold. Then, the material of the outer peripheral sealing member is injected by injection molding so that the outer peripheral sealing member, the above-described first closed space and the above-described notch are formed. The outer peripheral sealing member is formed at an outer side of the inner peripheral sealing members to close gaps between outer peripheral ribs of the pair of separators.

In Step (3), it is preferred that the material of the outer peripheral sealing member has an adhesive function and is a filler and a resin material. Specifically, it is preferred to use a molten thermoplastic resin.

Further, it is preferred to use a low-viscosity thermoplastic resin such as polypropylene having a melt viscosity of 80 Pa·s to 100 Pa·s at a temperature of 200° C. and a shear rate of 1000/s according to JIS K7199. However, the material is not particularly limited thereto. It is preferred to inject such low-viscosity thermoplastic resin at a low pressure, for example, in a way that a pressure that applies to the inner peripheral sealing members is 60 MPa to 70 MPa.

In this step of injecting the material of the outer peripheral sealing member by injection molding, it is possible to control injection of the material of the outer peripheral sealing member, for example, by controlling injection pressure of the material of the outer peripheral sealing member. However, the control is not limited thereto. For example, in injecting the material of the outer peripheral sealing member by injection molding, it is possible to control injection of the material of the outer peripheral sealing member by controlling air leak from the notches as well as injection pressure of the material of the outer peripheral sealing member.

When the fuel cell stack seal structure has predetermined configurations, it is preferred to perform the following operations in Step (1) to Step (3). By such production methods, it is possible to produce a desired fuel cell stack seal structure with high productivity.

In Step (1), an unapplied area for forming the notches is formed in such a position as to form the first closed space and a part of the notch, and the material of the inner-outer peripheral sealing members as a part of the outer peripheral sealing member is further applied to at least one of the pair of separators in an area from the narrow path of the pair of separators to an outer side of the narrow path. In this Step (1), it is preferred to use, for example, a thermoset adhesive as the materials of the inner peripheral sealing members and the inner-outer peripheral sealing members. Further, in this Step (1), for example, a dispenser or a roller can be used to apply the materials of the inner peripheral sealing members and the inner-outer peripheral sealing members.

In Step (2), the notch forming member is disposed at the unapplied area in a side face of the stack structure. The notch forming member used in this Step (2) is not particularly limited and may be any members that can reduce or prevent the materials from flowing into the notches and gaps between the measuring terminals. Examples of the notch forming member that can be used include resin members having the shape of a frame or a pair of plates. The notch forming member can be suitably arranged according to the position and the number of notches to be formed in a side face of the fuel cell module.

In Step (3), the material of the outer-outer peripheral sealing member as a part of the outer peripheral sealing member is injected so as to form the outer-outer peripheral sealing member and the remaining part of the notches at an outer side of the inter outer peripheral sealing members. In Step (3), it is preferred to use, for example, a molten thermoplastic resin as described above as the material of the outer-outer peripheral sealing member. Since the inner-outer peripheral sealing members have been already disposed, the allowable ranges of the melt viscosity and the injection pressure of the thermoplastic resin are wider compared to the above-described Step (3). In this step (3) of injecting the material of the outer-outer peripheral sealing member by injection molding, it is possible to control injection of the material of the outer-outer peripheral sealing member by controlling injection pressure of the material of the outer-outer peripheral sealing member. For example, the injection pressure may range from 60 MPa to 140 MPa.

The above-described predetermined configurations are the following configurations (i) to (vi).

(i) The outer peripheral ribs include respective protruded faces at which the distance between a pair of separators is uniform, and the outer peripheral ribs form the narrow path at which the distance between a pair of separators is narrower than the distance between the outer peripheral ends of the pair of separators.

(ii) The inner peripheral ends of the outer peripheral sealing member are disposed in the narrow path.

(iii) The outer peripheral sealing member includes the inner-outer peripheral sealing members and the outer-outer peripheral sealing member.

(iv) The inner-outer peripheral sealing members are disposed integrally in the narrow path and at an outer side of the narrow path.

(v) The outer-outer peripheral sealing member is disposed at an outer side of the inner-outer peripheral sealing members.

(vi) The outer peripheral sealing member includes the notch forming member at the notches.

The details of Step (2) will be described in detail referring to the drawing. The same reference signs are denoted to the same components as those of the above-described embodiments, and the description thereof is omitted.

Figure 13A:
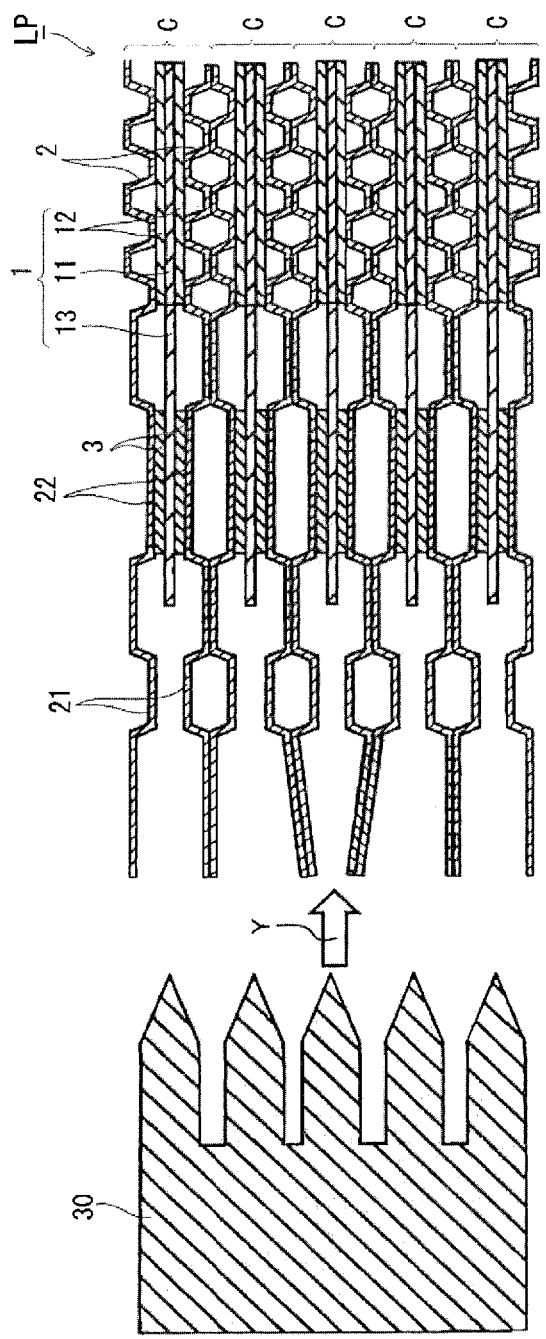
FIG. 13A is a schematic cross-sectional view of a stack structure in which a jig has not been inserted yet.
Figure 13B:
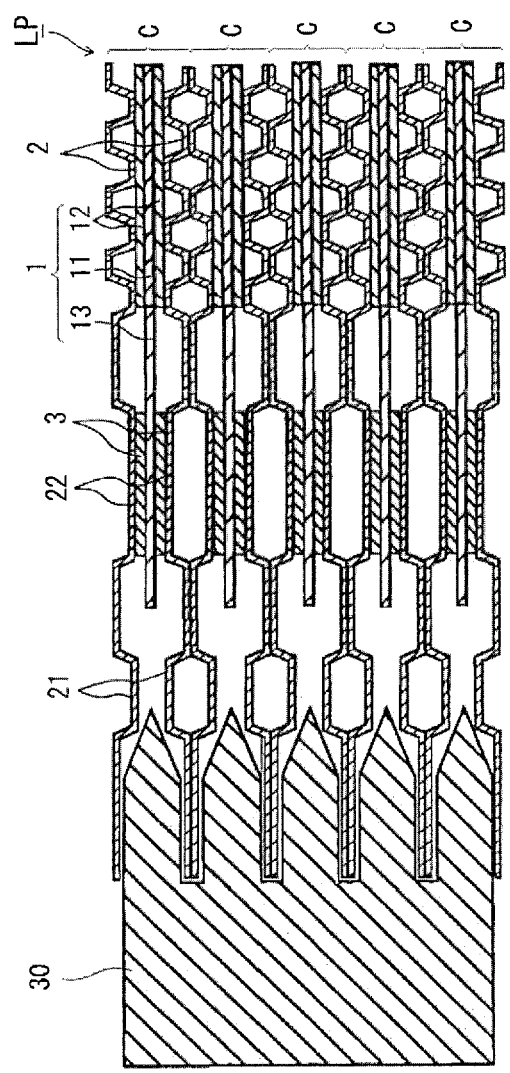
FIG. 13B is a schematic cross-sectional view of the stack structure in which the jig has already been inserted.

FIG. 13A is a schematic cross-sectional view of the stack structure in which a jig has not been inserted yet, and FIG. 13B is a schematic cross-sectional view of the stack structure in which the jig has been already inserted. In Step (2), when the separators (2, 2) are deformed as in the stack structure LP in FIG. 13A, the spacing between the separators (2, 2) can be adjusted to a predetermined distance by inserting a jig 30 in the direction of the arrow Y in FIG. 13B before the notch forming member is disposed. This facilitates disposing the notch forming member in the side face of the stack structure.

Figure 14A:
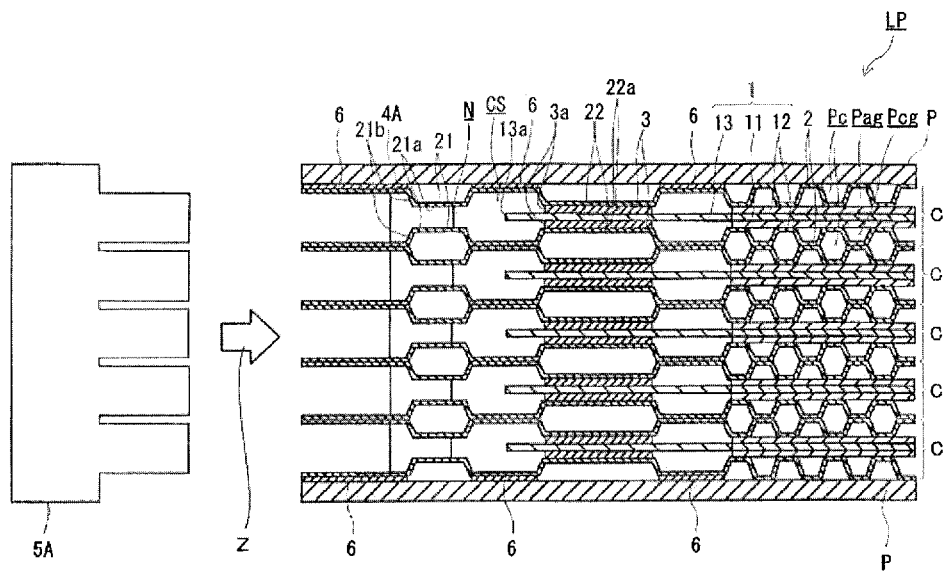
FIG. 14A is a cross-sectional view of a state in which an example of a notch forming member has not been inserted in a stack structure yet.
Figure 14B:
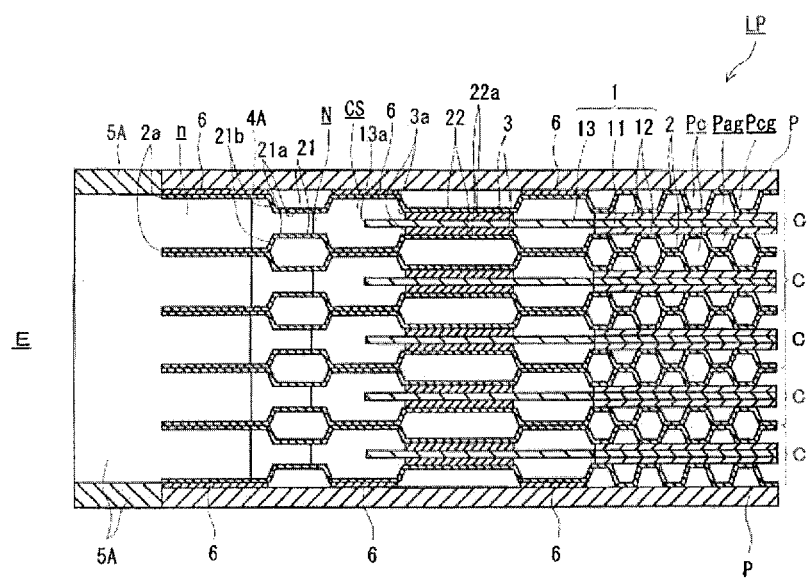
FIG. 14B is a cross-sectional view of a state in which the notch forming member has already been inserted in the stack structure.

FIG. 14A is a cross-sectional view of a state in which an example of the notch forming member has not been inserted in the stack structure yet, and FIG. 14B is a cross-sectional view of a state in which the example of the notch forming member has been already inserted in the stack structure. In Step (2), the notch forming member 5A is disposed at the unapplied area where the second inner resin material is not applied, which correspond to the notches n to be formed in the side face of the stack structure LP. This enables forming desired notches.

Figure 15A:
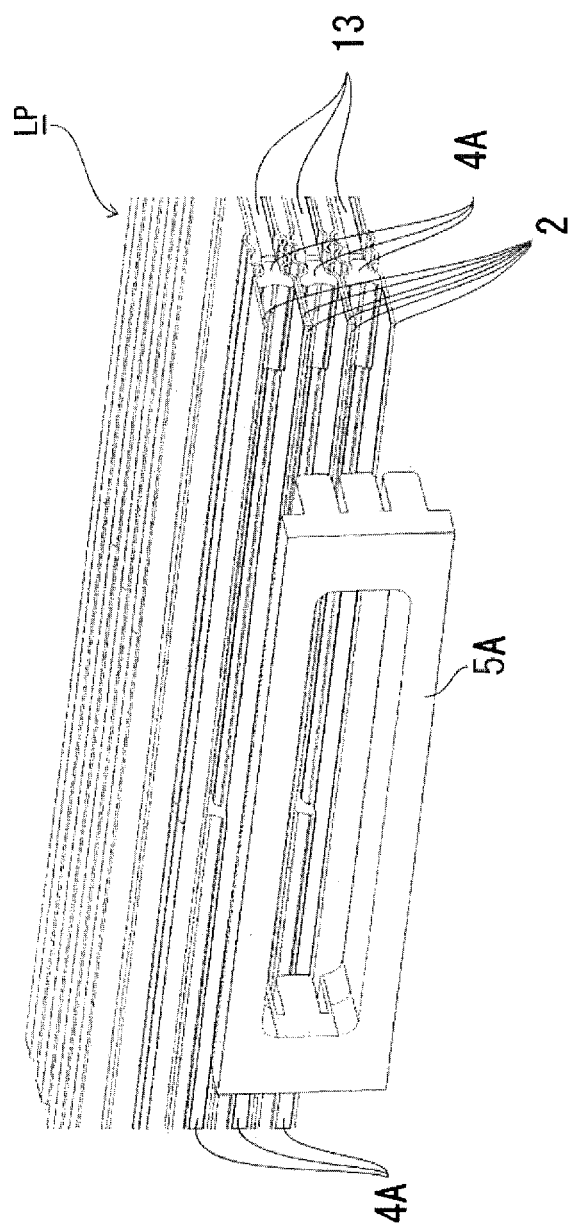
FIG. 15A is a perspective view of a main part of a state in which another example of the notch forming member has not been inserted in the stack structure yet.
Figure 15B:
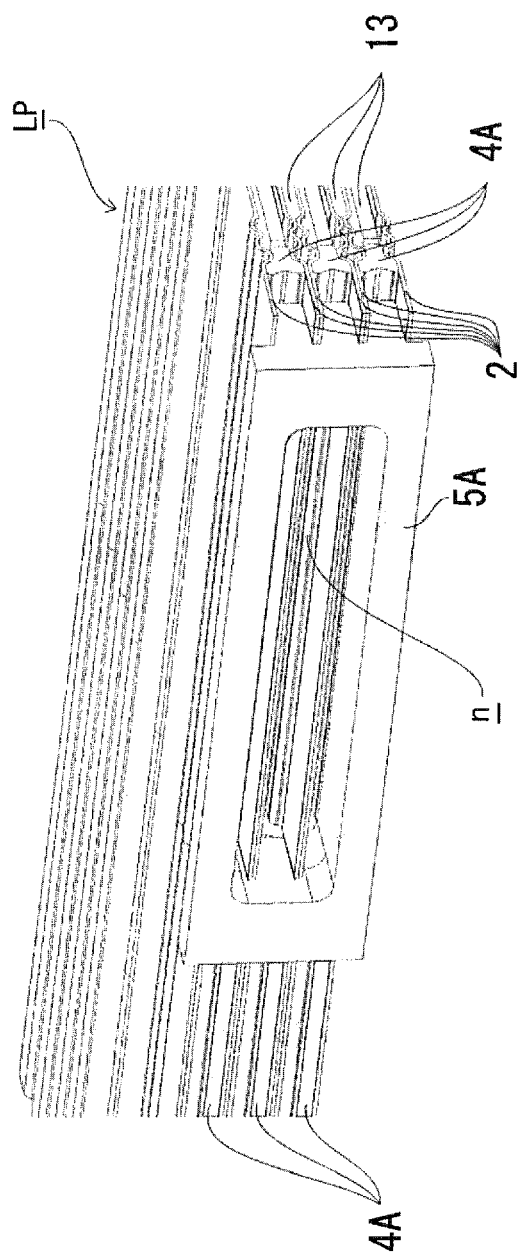
FIG. 15B is a perspective view of a main part of a state in which the notch forming member has already been inserted in the stack structure.
Figure 16A:
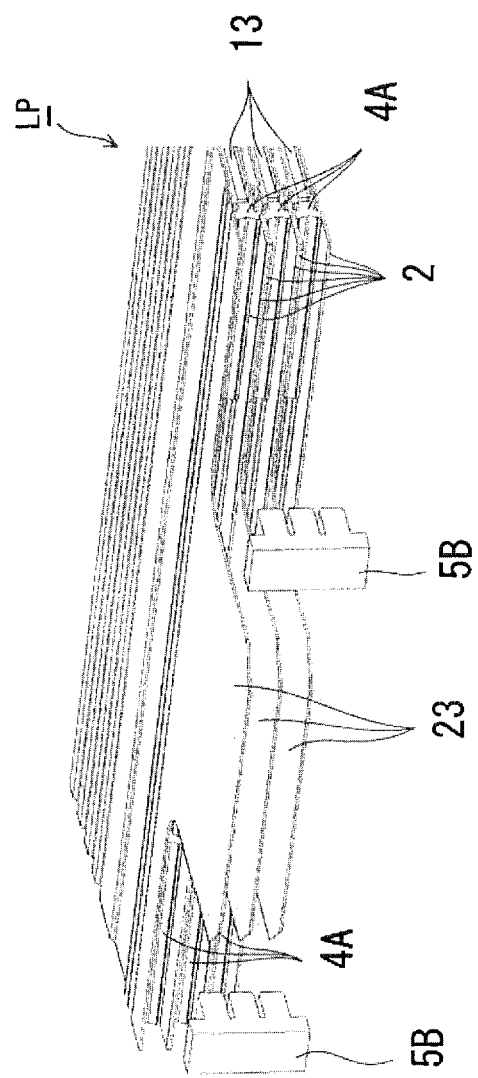
FIG. 16A is a perspective view of a main part of a state in which yet another example of the notch forming member has not been inserted in the stack structure yet.
Figure 16B:
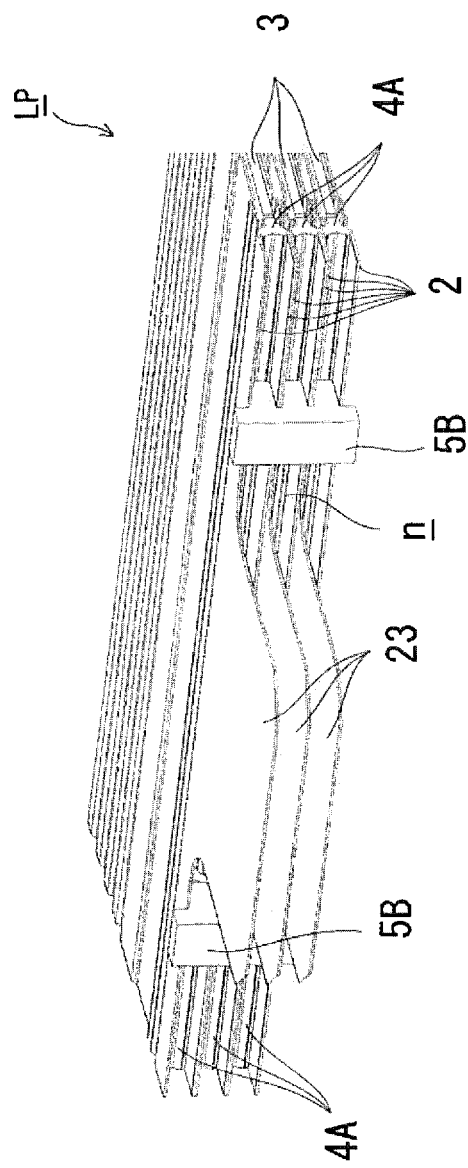
FIG. 16B is a perspective view of a main part of a state in which the notch forming member has already been inserted in the stack structure.

FIG. 15A is a perspective view of a main part of a state in which another example of the notch forming member has not been inserted in the stack structure, and FIG. 15B is a perspective view of the main part of a state in which the example of the notch forming member has been already inserted in the stack structure. FIG. 16A is a perspective view of a main part of a state in which yet another example of the notch forming member has not been inserted in the stack structure, and FIG. 16B is a perspective view of a main part of a state in which the example of the notch forming member has been already inserted in the stack structure. FIG. 15A and FIG. 15B and FIG. 16A and FIG. 16B illustrate an example of the stack structure in which three fuel cell single cells are stacked.

When the notch forming member is disposed on the side face of the stack structure in Step (2), a notch forming member 5A is inserted so as to be in contact with the inner-outer peripheral sealing members 4A as illustrated in FIG. 15B. Similarly, a notch forming member 5B is inserted so as to be in contact with the inner-outer peripheral sealing members 4A as illustrated in FIG. 16B. This can reduce or prevent resin from flowing into the notches and gaps between the measuring terminals.

While the present invention is described with a few embodiments, the present invention is not limited to these embodiments, and a variety of changes can be made within the features of the present invention.

REFERENCE SIGNS LIST

1 Membrane electrode assembly
2 Separator
2' End separator
2a Outer peripheral end
2b Opposed side
3 Inner peripheral sealing member
3a Outer peripheral end
4 Outer peripheral sealing member
4A Inner-outer peripheral sealing member
4B Outer-outer peripheral sealing member
4a Inner peripheral end
5A, 5B Notch forming member
6 Fourth sealing member
7 Second inner peripheral sealing member
8 Second outer peripheral sealing member
9 Third inner peripheral sealing member
10 Third outer peripheral sealing member
10A Third inner-outer peripheral sealing member
10a Inner peripheral end
11 Electrolyte membrane
12 Electrode
13 Frame
13a Outer peripheral end
21 Outer peripheral rib
21a Protruded face
21b Outer side face
22 Inner peripheral rib
22a Protruded face
23 Measuring terminal
30 Jig
56A, 56B End plate
57A, 57B Fastening plate
57s Slit
58A, 58B Reinforcing plate
FS Fuel cell stack
C Fuel cell single cell
M, M2 to M4 Fuel cell module
P Sealing plate
LP Stack structure
H1 to H6 Manifold hole
Pag Anode gas channel
Pcg Cathode gas channel
Pa Coolant channel
D, d, $d_N$ Distance
E Outside
N Narrow path
n Notch
CS First closed space
CS2 Second closed space
CS3 Third closed space

The invention claimed is:

1. A fuel cell stack seal structure of a fuel cell stack, the fuel cell stack comprising a plurality of fuel cell single cells that are stacked, each of the fuel cell single cells comprising a membrane electrode assembly and a pair of separators holding the membrane electrode assembly between the pair of separators, wherein at least one of the pair of separators comprises an inner peripheral rib that protrudes at least towards a mutually facing side of the pair of separators at a peripheral part of the separator, at least one of the pair of separators comprises an outer peripheral rib that protrudes at least towards a mutually facing side of the pair of separators at an outer side of the inner peripheral rib, the fuel cell stack seal structure comprising:
 inner peripheral sealing members that close a gap between inner peripheral ribs of the pair of separators of each of the fuel cell single cells; and
 an outer peripheral sealing member that is disposed at an outer side of the inner peripheral sealing members to close a gap between outer peripheral ribs of the pair of separators,
wherein a first closed space is formed between the inner peripheral sealing members and the outer peripheral sealing member,
wherein the outer peripheral sealing member has a notch that communicates the first closed space with the outside to allow air to move between the first closed space and the outside, and
wherein the outer peripheral sealing member comprises a notch forming member at the notch.

2. The fuel cell stack seal structure according to claim 1, wherein the outer peripheral rib comprises a portion at which a distance between the pair of separators is shorter than a distance between outer peripheral ends of the pair of separators.

3. The fuel cell stack seal structure according to claim 1, wherein each of the pair of separators comprises the outer peripheral rib, the outer peripheral rib comprises a protruded face and a distance between the protruded face of a first of the pair of separators and the protruded face of a second of the pair of separators is uniform, and the outer peripheral rib forms a narrow path at which the distance between the pair of separators is shorter than the distance between the outer peripheral ends of the pair of separators.

4. The fuel cell stack seal structure according to claim 3, wherein an inner peripheral end of the outer peripheral sealing member is disposed in the narrow path.

5. The fuel cell stack seal structure according to claim 4, wherein the outer peripheral sealing member comprises inner-outer peripheral sealing members and an outer-outer peripheral sealing member,
 the inner-outer peripheral sealing members are integrally disposed in the narrow path and at an outer side of the narrow path, and
 the outer-outer peripheral sealing member is disposed at an outer side of the inner-outer peripheral sealing members.

6. The fuel cell stack seal structure according to claim 5, wherein the inner-outer peripheral sealing members contain a thermoset resin, and the outer-outer peripheral sealing member contains a thermoplastic resin.

7. The fuel cell stack seal structure according to claim 2, wherein each of the pair of separators comprises the outer peripheral rib, the outer peripheral rib comprises a protruded face and a distance between the protruded face of a first of the pair of separators and the protruded face of a second of the pair of separators is uniform, and the outer peripheral rib forms a narrow path at which the distance between the pair of separators is shorter than the distance between the outer peripheral ends of the pair of separators.

8. The fuel cell stack seal structure according to claim 1, wherein the outer peripheral sealing member and/or the inner peripheral sealing members have an adhesive function.

9. The fuel cell stack seal structure according to claim 1, wherein the outer peripheral sealing member and/or the inner peripheral sealing members are made of a filler.

10. The fuel cell stack seal structure according to claim 9, wherein the filler is made of a resin material.

11. The fuel cell stack seal structure according to claim 1, wherein the membrane electrode assembly comprises a frame, and the frame is held by the inner peripheral rib.

12. The fuel cell stack seal structure according to claim 1, further comprising:
 a second inner peripheral sealing member that closes a gap between peripheral edges of the fuel cell single cells: and
 a second outer peripheral sealing member that is disposed at an outer side of the second inner peripheral sealing member to close the gap between the peripheral edges of the fuel cell single cells,
 wherein a second closed space is formed between the second inner peripheral sealing member and the second outer peripheral sealing member, and
 the second outer peripheral sealing member has a notch that communicates the second closed space with the outside.

13. The fuel cell stack seal structure according to claim 1, wherein the fuel cell stack comprises a plurality of fuel cell modules that are stacked, each of the modules comprising the plurality of fuel cell single cells that are stacked.

14. The fuel cell stack seal structure according to claim 13, further comprising:
 a sealing plate disposed between the fuel cell modules;
 a third inner peripheral sealing member that closes a gap between a peripheral edge of an end separator of each of the fuel cell modules and a peripheral edge of the sealing plate; and
 a third outer peripheral sealing member that is disposed at an outer side of the third inner peripheral sealing member to close the gap between the peripheral edge of the end separator of each of the fuel cell modules and the peripheral edge of the sealing plate,
 wherein a third closed space is formed between the third inner peripheral sealing member and the third outer peripheral sealing member, and
 the third outer peripheral sealing member has a notch that communicates the third closed space with the outside.

15. The fuel cell stack seal structure according to claim 1, wherein at least one of the pair of separators comprises a protruded measuring terminal that extends in an in-plane direction of the separators, and
 the measuring terminal is exposed at the notch.

16. A fuel cell stack seal structure of a fuel cell stack, the fuel cell stack comprising a plurality of fuel cell single cells that are stacked, each of the fuel cell single cells comprising a membrane electrode assembly and a pair of separators holding the membrane electrode assembly between the pair of separators,
 wherein at least one of the pair of separators comprises an inner peripheral rib that protrudes at least towards a mutually facing side of the pair of separators at a peripheral part of the separator, at least one of the pair of separators comprises an outer peripheral rib that protrudes at least towards a mutually facing side of the pair of separators at an outer side of the inner peripheral rib, the fuel cell stack seal structure comprising:
- inner peripheral sealing members that close a gap between inner peripheral ribs of the pair of separators of each of the fuel cell single cells; and
- an outer peripheral sealing member that is disposed at an outer side of the inner peripheral sealing members to close a gap between outer peripheral ribs of the pair of separators,
- wherein a first closed space is formed between the inner peripheral sealing members and the outer peripheral sealing member,
- wherein the outer peripheral sealing member has a notch that communicates the first closed space with the outside, and
- wherein the outer peripheral sealing member comprises a notch forming member at the notch.

17. The fuel cell stack seal structure according to claim 16, wherein the notch forming member is covered with the outer peripheral sealing member.

18. A method for producing a fuel cell stack seal structure of a fuel cell stack, the fuel cell stack comprising a plurality of fuel cell single cells that are stacked, each of the fuel cell single cells comprising a membrane electrode assembly and a pair of separators holding the membrane electrode assembly between the pair of separators, wherein at least one of the pair of separators comprises an inner peripheral rib that protrudes at least towards a mutually facing side of the pair of separators at a peripheral edge of the separator,
- at least one of the pair of separators comprises an outer peripheral rib that protrudes at least towards the mutually facing side of the pair of separators at an outer side of the inner peripheral rib,
- the fuel cell stack seal structure comprising:
  - inner peripheral sealing members that close a gap between inner peripheral ribs of the pair of separators of each of the fuel cell single cell; and
  - an outer peripheral sealing member that is disposed at an outer side of the inner peripheral sealing members to close a gap between outer peripheral ribs of the pair of separators,
  - wherein a first closed space is formed between the inner peripheral sealing members and the outer peripheral sealing member, and
  - the outer peripheral sealing member has a notch that communicates the first closed space with the outside,
- the method comprising:
  - Step (1) of applying a material of the inner peripheral sealing members onto the inner peripheral rib of at least one of the pair of separators to form the inner peripheral sealing members that close gaps between the inner peripheral ribs of the pair of separators when intervening the membrane electrode assembly between the pair of separators, so as to produce a stack structure;
  - Step (2), which is performed subsequent to Step (1), of disposing a notch forming member for forming the notch on a side face of the stack structure at the outer peripheral sealing member; and
  - Step (3), which is performed subsequent to Step (2), of placing the stack structure in a mold and injecting a material of the outer peripheral sealing member so as to form the outer peripheral sealing member, the first closed space and the notch, in which the outer peripheral sealing member is formed at an outer side of the inner peripheral sealing members to close the gap between the outer peripheral ribs of the pair of separators, the notch communicating the first closed space with the outside to allow air to move between the first closed space and the outside.

19. The method for producing the fuel cell stack seal structure according to claim 18,
- wherein the outer peripheral rib comprises a protruded face and a distance between the protruded faces of the pair of separators is uniform, and the outer peripheral rib forms a narrow path at which a distance between the pair of separators is shorter than a distance between the outer peripheral ends of the pair of separators,
- an inner peripheral end of the outer peripheral sealing member is disposed in the narrow path,
- the outer peripheral sealing member comprises inner-outer peripheral sealing members and an outer-outer peripheral sealing member,
- the inner-outer peripheral sealing member is disposed integrally in the narrow path and at an outer side of the narrow path, and
- the outer-outer peripheral sealing member is disposed at an outer side of the inner-outer peripheral sealing members,
- wherein Step (1) comprises setting an unapplied area for forming the notch in such a position as to form the first closed space and a part of the notch, and further applying a material of the inner-outer peripheral sealing members as a part of the outer peripheral sealing member to at least one of the pair of separators in an area from the narrow path of the pair of separators to an outer side of the narrow path,
- Step (2) comprises disposing the notch forming member at the unapplied area in a side face of the stack structure, and
- Step (3) comprises injecting a material of the outer-outer peripheral sealing member as a part of the outer peripheral sealing member so as to form the outer-outer peripheral sealing member and a remaining part of the notch at an outer side of the inter-outer peripheral sealing members.

20. The method for producing the fuel cell stack seal structure according to claim 19,
- wherein the material of the inner-outer peripheral sealing members is a thermoset adhesive, and
- the material of the outer-outer peripheral sealing member is a molten thermoplastic resin.

* * * * *